US011872808B2

(12) United States Patent
Ishimoto et al.

(10) Patent No.: US 11,872,808 B2

(45) Date of Patent: Jan. 16, 2024

(54) CARTRIDGE

(71) Applicant: SEIKO EPSON CORPORATION, Tokyo (JP)

(72) Inventors: Akio Ishimoto, Shiojiri (JP); Taishi Sasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 320 days.

(21) Appl. No.: 17/418,904

(22) PCT Filed: Dec. 23, 2019

(86) PCT No.: PCT/JP2019/050327

§ 371 (c)(1),
(2) Date: Jun. 28, 2021

(87) PCT Pub. No.: WO2020/137962

PCT Pub. Date: Jul. 2, 2020

(65) Prior Publication Data

US 2022/0009252 A1 Jan. 13, 2022

(30) Foreign Application Priority Data

Dec. 26, 2018 (JP) ................................ 2018-243223

(51) Int. Cl.
*B41J 15/04* (2006.01)
*B41J 32/00* (2006.01)

(52) U.S. Cl.
CPC ............ *B41J 15/044* (2013.01); *B41J 32/00* (2013.01)

(58) Field of Classification Search
CPC . B41J 15/044; B41J 32/00; B41J 17/32; B41J 3/382; B41J 3/36
USPC ........................................................ 347/214
See application file for complete search history.

(56) References Cited

U.S. PATENT DOCUMENTS 5,551,786 A * 9/1996 Webster ................ B41J 11/666 226/86
2016/0159123 A1* 6/2016 Sakano .................. B41J 32/00 347/214

FOREIGN PATENT DOCUMENTS

| | | | |
|---|---|---|---|
| CN | 203844430 | U | 9/2014 |
| JP | S63-156753 | U | 10/1988 |
| JP | H03-215066 | A | 9/1991 |
| JP | 2000-006488 | A | 1/2000 |
| JP | 2004-098426 | A | 4/2004 |

(Continued)

OTHER PUBLICATIONS

Feb. 10, 2020 International Search Report issued in International Patent Application No. PCT/JP2019/050327.

*Primary Examiner* — Matthew Luu
*Assistant Examiner* — Alexander D Shenderov
(74) *Attorney, Agent, or Firm* — Oliff PLC

(57) ABSTRACT

A cartridge reduces a movement amount of a center of gravity of a cartridge accompanied by the progress of the winding of an ink ribbon. The cartridge to be installed in a tape printing device includes a platen roller, a paying-out core on which an ink ribbon is wound, and a winding core that winds up the ink ribbon paid out from the paying-out core. When seen from a rotational axis direction parallel to a rotational axis of the paying-out core and a rotational axis of the winding core, the paying-out core and the winding core are arranged to at least partially overlap an imaginary line that passes through a center of the platen roller and extends in a longitudinal direction of the cartridge.

8 Claims, 16 Drawing Sheets

(56) References Cited

FOREIGN PATENT DOCUMENTS

| | | | |
|---|---|---|---|
| JP | 2013-144441 | A | 7/2013 |
| WO | 2011/074086 | A1 | 6/2011 |

* cited by examiner

CARTRIDGE

TECHNICAL FIELD

The present invention relates to a cartridge to be installed in a tape printing device.

BACKGROUND ART

Conventionally, a tape cassette including a tape driving roller, a ribbon spool on which an ink ribbon is wound, and a ribbon winding spool that winds up the ink ribbon paid out from the ribbon spool has been known as disclosed in Patent Document 1.

[Patent Document 1] JP-A-2013-144441

DISCLOSURE OF THE INVENTION

In a conventional tape cassette, a ribbon winding spool is provided at a position distant from an imaginary line that passes through the center of a tape driving roller and the center of a ribbon spool. Therefore, the center of gravity of the tape cassette moves in a direction crossing the imaginary line as the winding of an ink ribbon progresses. That is, the tape driving roller that is a heavy stuff is provided at a position shifted from an extension line in the movement direction of the center of gravity. Therefore, the movement amount of the center of gravity of the tape cassette is increased.

A cartridge according to the present invention is a cartridge to be installed in a tape printing device, the cartridge including: a platen roller; a paying-out core on which an ink ribbon is wound; and a winding core that winds up the ink ribbon paid out from the paying-out core, wherein, when seen from a rotational axis direction parallel to a rotational axis of the paying-out core and a rotational axis of the winding core, the paying-out core and the winding core are arranged to at least partially overlap an imaginary line that passes through a center of the platen roller and extends in a longitudinal direction of the cartridge.

BEST MODES FOR CARRYING OUT THE INVENTION

Figure 1:
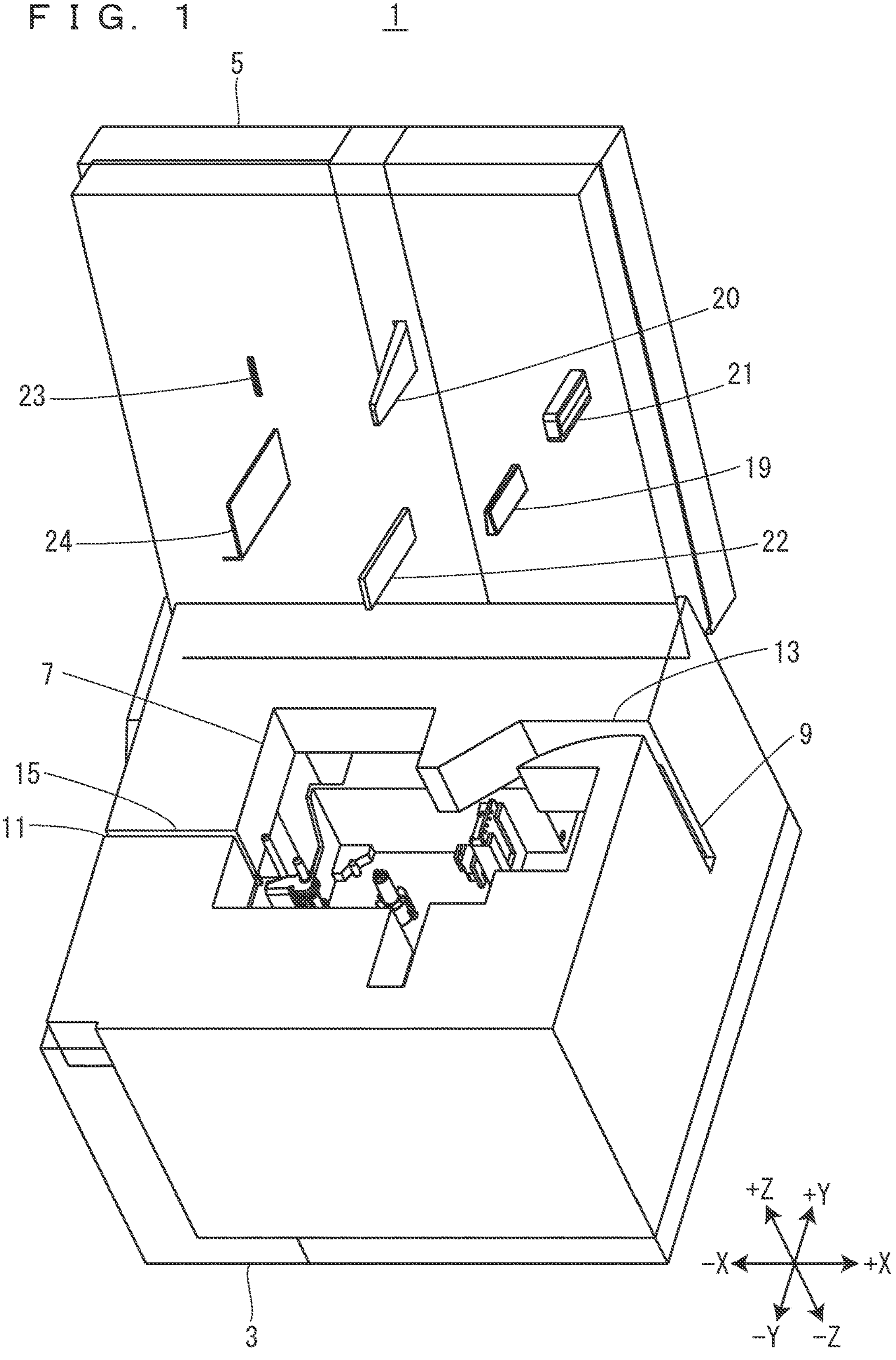
FIG. 1 is a perspective view of a tape printing device.

Directions in the following drawings will be defined. The vertical direction of a tape printing device 1 is defined as a Z direction, a longitudinal direction orthogonal to the Z direction is defined as an X direction, and a cross direction orthogonal to the Z direction and the X direction is defined as a Y direction. In the Z direction, a lower direction or a gravity direction is defined as a −Z direction, and an upper direction is defined as a +Z direction. In the Y direction, one direction is defined as a +Y direction, and a direction opposite to the one direction is defined as a −Y direction. In FIG. 1, the rotational shaft side of an installation-part cover 5 is defined as the +Y direction. In the X direction, one direction is defined as a +X direction, and a direction opposite to the one direction is defined as a −X direction. In FIG. 1, a right side in a plan view is defined as the +X direction. Note that these directions are given only for the convenience of descriptions and do not intend to limit the following embodiments at all as a matter of course.

[Overviews of Tape Printing Device, Tape Cartridge, and Ribbon Cartridge]

The overviews of the tape printing device 1, a tape cartridge 101, and a ribbon cartridge 201 will be described on the basis of FIGS. 1 to 3. In the tape printing device 1, the tape cartridge 101 and the ribbon cartridge 201 are alternatively installed.

Figure 2:
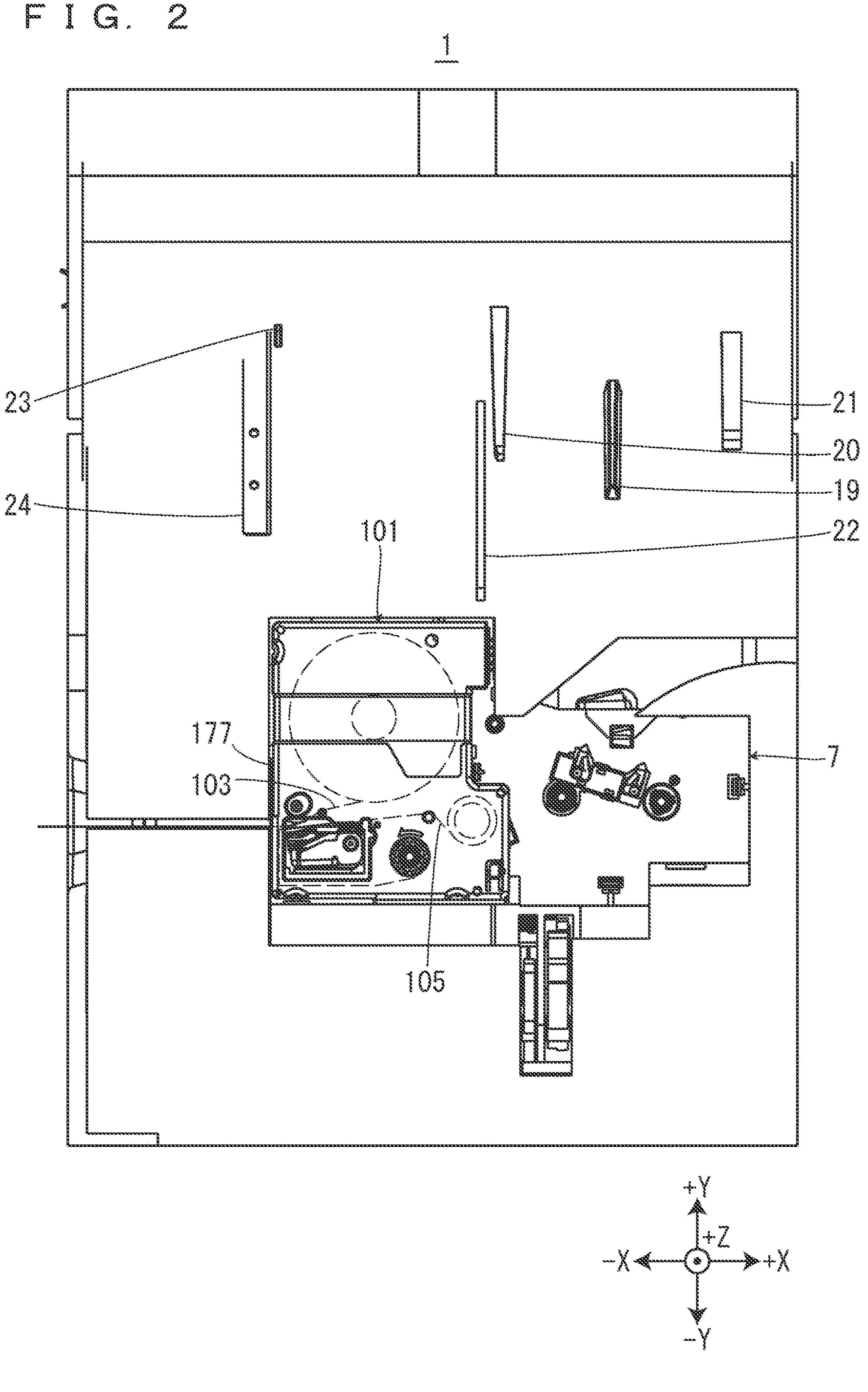
FIG. 2 is a view of the tape printing device with a tape cartridge installed therein when seen from a front side in an installation direction.

As shown in FIG. 2, a first printing tape 103 and a first ink ribbon 105 are accommodated in the tape cartridge 101. In a state in which the tape cartridge 101 is installed in a cartridge installation part 7, the tape printing device 1 performs printing on the first printing tape 103, while feeding the first printing tape 103 and the first ink ribbon 105 accommodated in the tape cartridge 101.

Figure 3:
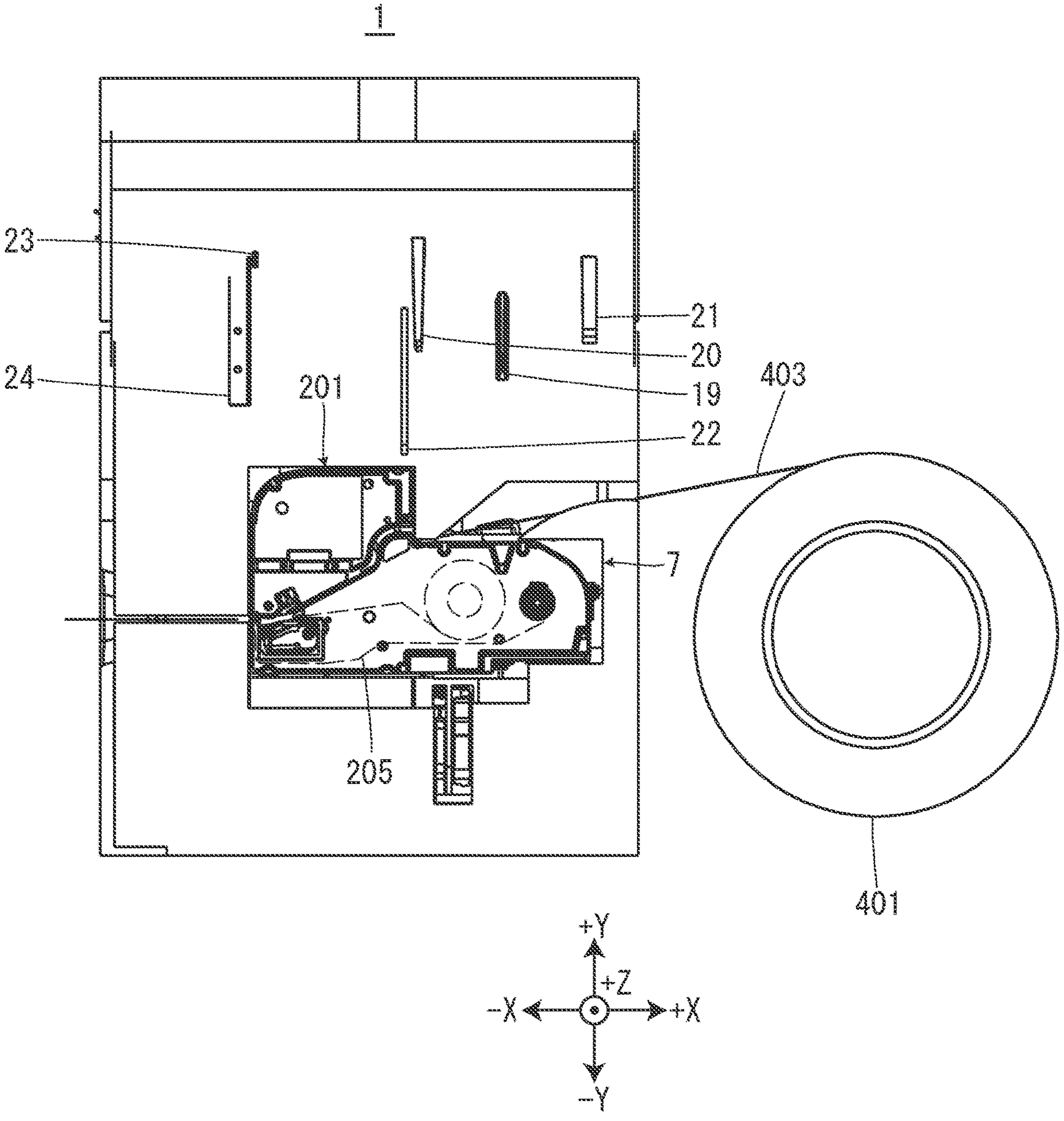
FIG. 3 is a view of the tape printing device with a ribbon cartridge installed therein when seen from the front side in the installation direction.

As shown in FIG. 3, a second ink ribbon 205 is accommodated in the ribbon cartridge 201. In a state in which the ribbon cartridge 201 is installed in the cartridge installation part 7, a second printing tape 403 that has been paid out from a tape roll 401 provided outside the tape printing device 1 is introduced into the tape printing device 1. The tape printing device 1 performs printing on the second printing tape 403, while feeding the introduced second printing tape 403 and the second ink ribbon 205 accommodated in the ribbon cartridge 201.

Note that the length of the second printing tape 403 in the tape roll 401 that has not been used and the length of the second ink ribbon 205 accommodated in the ribbon cartridge 201 that has not been used are not particularly limited but are longer than the length of the first printing tape 103 and the length of the first ink ribbon 105 accommodated in the tape cartridge 101 that has not been used, respectively, in the present embodiment. Therefore, the ribbon cartridge 201 is installed, for example, when large amounts of labels are created at once.

[Tape Printing Device]

Figure 4:
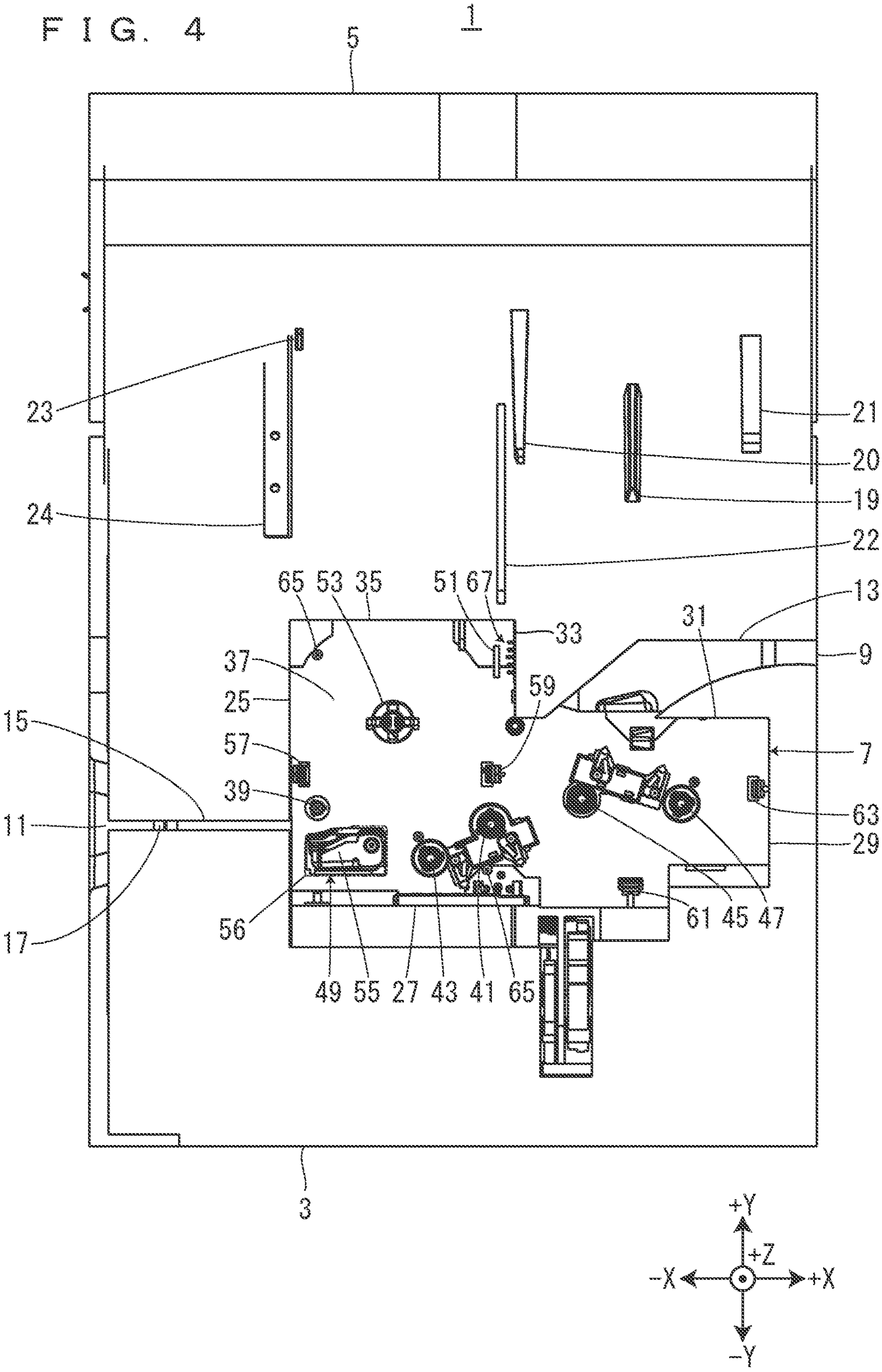
FIG. 4 is a view of the tape printing device when seen from the front side in the installation direction.

The tape printing device 1 will be described on the basis of FIG. 4. The tape printing device 1 includes a device case 3, the installation-part cover 5, and the cartridge installation part 7. The device case 3 is formed into a substantially cuboid shape. The device case 3 has a device-side tape introduction port 9 for the second printing tape 403 paid out from the tape roll 401 on its +X-side surface, and has a device-side tape ejection port 11 shared between the tape cartridge 101 and the ribbon cartridge 201 on its −X-side surface. The device-side tape introduction port 9 introduces the second printing tape 403 from the outside to the inside of the device case 3. The device-side tape ejection port 11 ejects the introduced second printing tape 403 to the outside of the device case 3. Further, the device-side tape ejection port 11 ejects the first printing tape 103 delivered from the tape cartridge 101 installed in the cartridge installation part 7 to the outside of the device case 3. The device-side tape introduction port 9 and the device-side tape ejection port 11 are formed into a slit shape extending in the Z direction. Further, in a tape feeding path inside the tape printing device 1, a direction in which the second printing tape 403 is directed from the device-side tape introduction port 9 to the device-side tape ejection port 11 is defined as a downstream, and a direction opposite to the above direction is defined as an upstream.

The device case 3 has a tape introduction path 13 that connects the device-side tape introduction port 9 and the cartridge installation part 7 to each other. Further, the device case 3 has a tape ejection path 15 that connects the cartridge installation part 7 and the device-side tape ejection port 11 to each other. The tape introduction path 13 and the tape ejection path 15 are formed into a groove shape having an opening on the +Z side. The tape ejection path 15 has a cutter 17. The cutter 17 cuts off the first printing tape 103 or the second printing tape 403 in the tape ejection path 15.

The installation-part cover 5 opens/closes the cartridge installation part 7. The installation-part cover 5 has a first pressing protrusion 19, a second pressing protrusion 20, a third pressing protrusion 21, a fourth pressing protrusion 22, a fifth pressing protrusion 23, and a sixth pressing protrusion 24 on its inside surface. The installation-part cover 5 has a keyboard and a display on its outside surface although not shown in the figure. The keyboard receives input operations to input printing information such as character strings and issue various instructions to perform printing or the like. The display displays various information besides printing information input via the keyboard. The display has a rotation shaft serving as a hinge, and is configured to be accommodatable in the installation-part cover 5. When the display is accommodated in the installation-part cover 5, the display surface of the display faces the keyboard. When the keyboard receives an input operation to perform printing, the tape printing device 1 performs printing processing on the basis of printing information input via the keyboard. Note that the tape printing device 1 may be configured to include input display means such as a touch panel type display instead of the keyboard and the display. Further, the tape printing device 1 may be configured to perform printing processing on the basis of printing data and a command received from an external device such as a personal computer and a smart phone. In other words, a printing system in which the tape printing device 1 and an external device serving as an operation terminal are combined together may be configured. When the tape printing device 1 is configured to be connectable to such an external device, the keyboard and the display may or may not be provided in the tape printing device 1.

The cartridge installation part 7 is formed into a concave shape having an opening on the +Z side. Here, in the inner peripheral surface of the cartridge installation part 7, an inner peripheral surface on the −X side is defined as a first installation inner peripheral surface 25. An inner peripheral surface extending to the +X side from the end on the −Y side of the first installation inner peripheral surface 25 is defined as a second installation inner peripheral surface 27. An inner peripheral surface extending to the +Y side from the end on the +X side of the second installation inner peripheral surface 27 is defined as a third installation inner peripheral surface 29. An inner peripheral surface extending to the −X side from the end on the +Y side of the third installation inner peripheral surface 29 is defined as a fourth installation inner peripheral surface 31. An inner peripheral surface extending to the +Y side from the end on the −X side of the fourth installation inner peripheral surface 31 is defined as a fifth installation inner peripheral surface 33. An inner peripheral surface extending to the −X side from the end on the +Y side of the fifth installation inner peripheral surface 33 is defined as a sixth installation inner peripheral surface 35. The end on the −X side of the sixth installation inner peripheral surface 35 is connected to the end on the +Y side of the first installation inner peripheral surface 25. The downstream end of the tape introduction path 13 opens into the fourth installation inner peripheral surface 31. The upstream end of the tape ejection path 15 opens into the first installation inner peripheral surface 25.

The cartridge installation part 7 has, on its bottom surface, i.e., its −Z-side surface, a platen shaft 39, a first winding shaft 43, a first paying-out shaft 41, a second paying-out shaft 45, and a second winding shaft 47 provided to protrude to the +Z side in an order from the −X side.

The platen shaft 39 has a larger protrusion amount with respect to a front side in an installation direction than the first paying-out shaft 41, the first winding shaft 43, the second paying-out shaft 45, and the second winding shaft 47. When the tape cartridge 101 or the ribbon cartridge 201 is installed in the cartridge installation part 7, the platen shaft 39 is inserted into a first platen roller 109 or a second platen roller 203 that will be described later to guide the installation of the tape cartridge 101 or the ribbon cartridge 201. Note that the installation direction of the tape cartridge 101 and the ribbon cartridge 201 will be simply defined as an "installation direction" below, and the installation direction is parallel to a direction in which the platen shaft 39 extends, i.e., the Z direction. Further, the front side in the installation direction indicates the +Z side, and a back side in the installation direction indicates the −Z side.

Further, the cartridge installation part 7 has, on the installation bottom surface 37, a head part 49, an engagement convex part 51, and an insertion convex part 53 provided to protrude to the front side in the installation direction. The head part 49 is positioned on the −Y side of the platen shaft 39. The head part 49 includes a printing head 55 and a head cover 56 that covers at least the +X side, the −Y side, and the front side in the installation direction of the printing head 55. The printing head 55 is a thermal head including a heat generation element. The head cover 56 is formed into a substantially rectangular shape when seen from the front side in the installation direction. When the tape cartridge 101 or the ribbon cartridge 201 is installed in the cartridge installation part 7, the head cover 56 guides the installation of the tape cartridge 101 or the ribbon cartridge 201 together with the platen shaft 39. In FIG. 4, the head cover 56 is imaginarily indicated by two-dot chain lines in order to show the printing head 55. The engagement convex part 51 is positioned close to a corner part at which the fifth installation inner peripheral surface 33 and the sixth installation inner peripheral surface 35 cross each other, and formed into a plate shape facing the fifth installation inner peripheral surface 33. That is, the engagement convex part 51 is formed into a substantially rectangular shape long in the Y direction when seen from the front side in the installation direction. Further, the engagement convex part 51 protrudes from the installation bottom surface 37 in a cantilevered state. The insertion convex part 53 is positioned at a substantially intermediate part between the engagement convex part 51 and the platen shaft 39, and formed into a substantially-stepped cylindrical shape having a larger diameter on the back side in the installation direction and a smaller diameter on the front side in the installation direction.

In addition, the cartridge installation part 7 has, on the installation bottom surface 37, a first hook 57, a second hook 59, a third hook 61, and a fourth hook 63 provided to protrude to the front side in the installation direction. The first hook 57 is positioned on the +Y side of the platen shaft 39 and at the end on the −X side of the installation bottom surface 37. The second hook 59 is positioned on the +Y side of the first paying-out shaft 41 and at a position facing the first hook 57 in the X direction. The third hook 61 is positioned on the −Y side of a substantially intermediate position between the second paying-out shaft 45 and the second winding shaft 47 and at the end on the −Y side of the installation bottom surface 37. The fourth hook 63 is positioned on the +X side of the second winding shaft 47 and at the end on the +X side of the installation bottom surface 37. Further, the cartridge installation part 7 has, on the installation bottom surface 37, a plurality of positioning pins 65 provided to protrude to the front side in the installation direction.

The cartridge installation part 7 has, on the fifth installation inner peripheral surface 33, a substrate connection part 67 provided to face the engagement convex part 51 on the +X side of the engagement convex part 51. The substrate connection part 67 is connected to a control circuit (not shown) that controls the respective parts of the tape printing device 1.

[Ribbon Cartridge]

Figure 5:
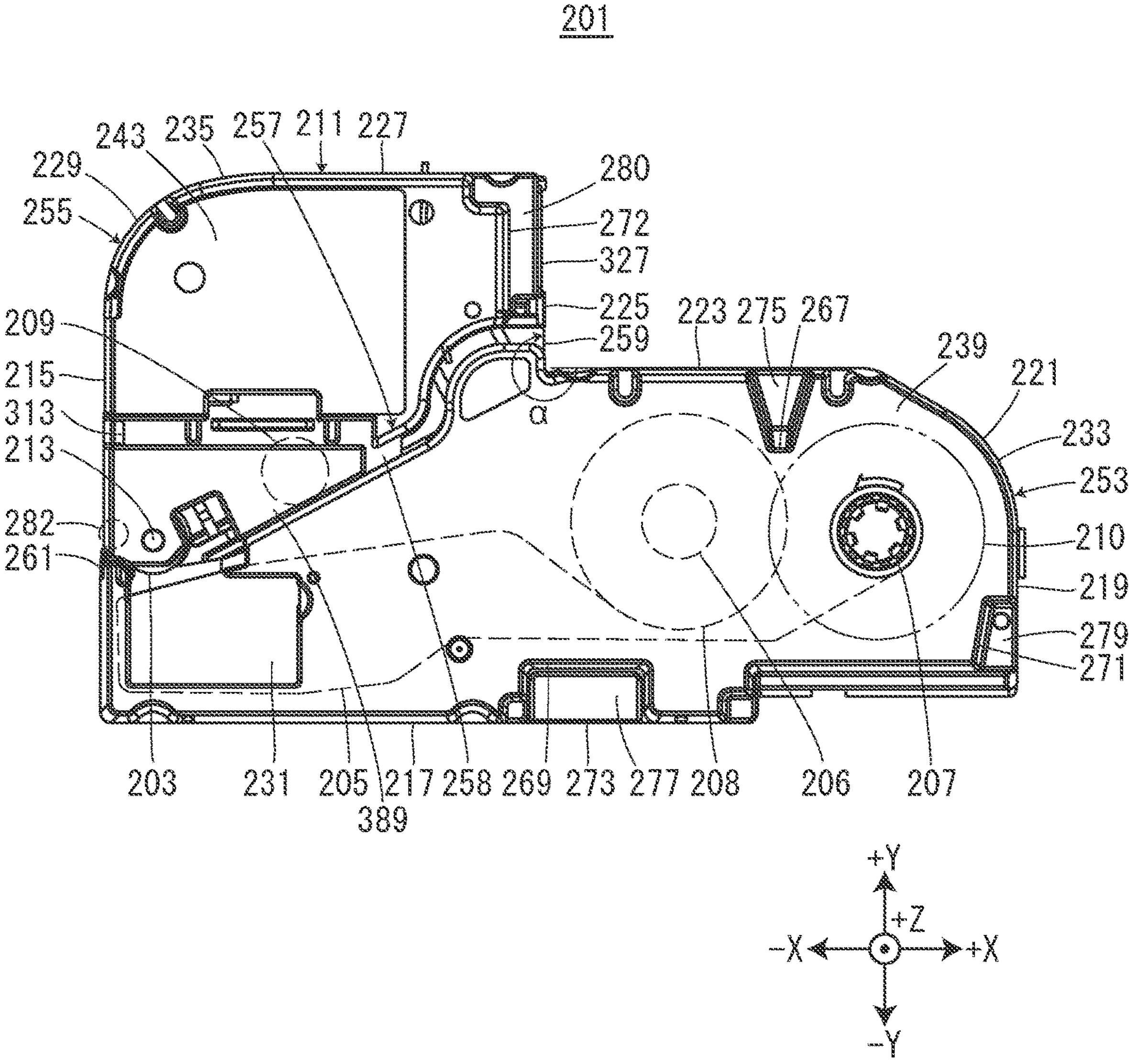
FIG. 5 is a view of the ribbon cartridge when seen from the front side in the installation direction.
Figure 6:
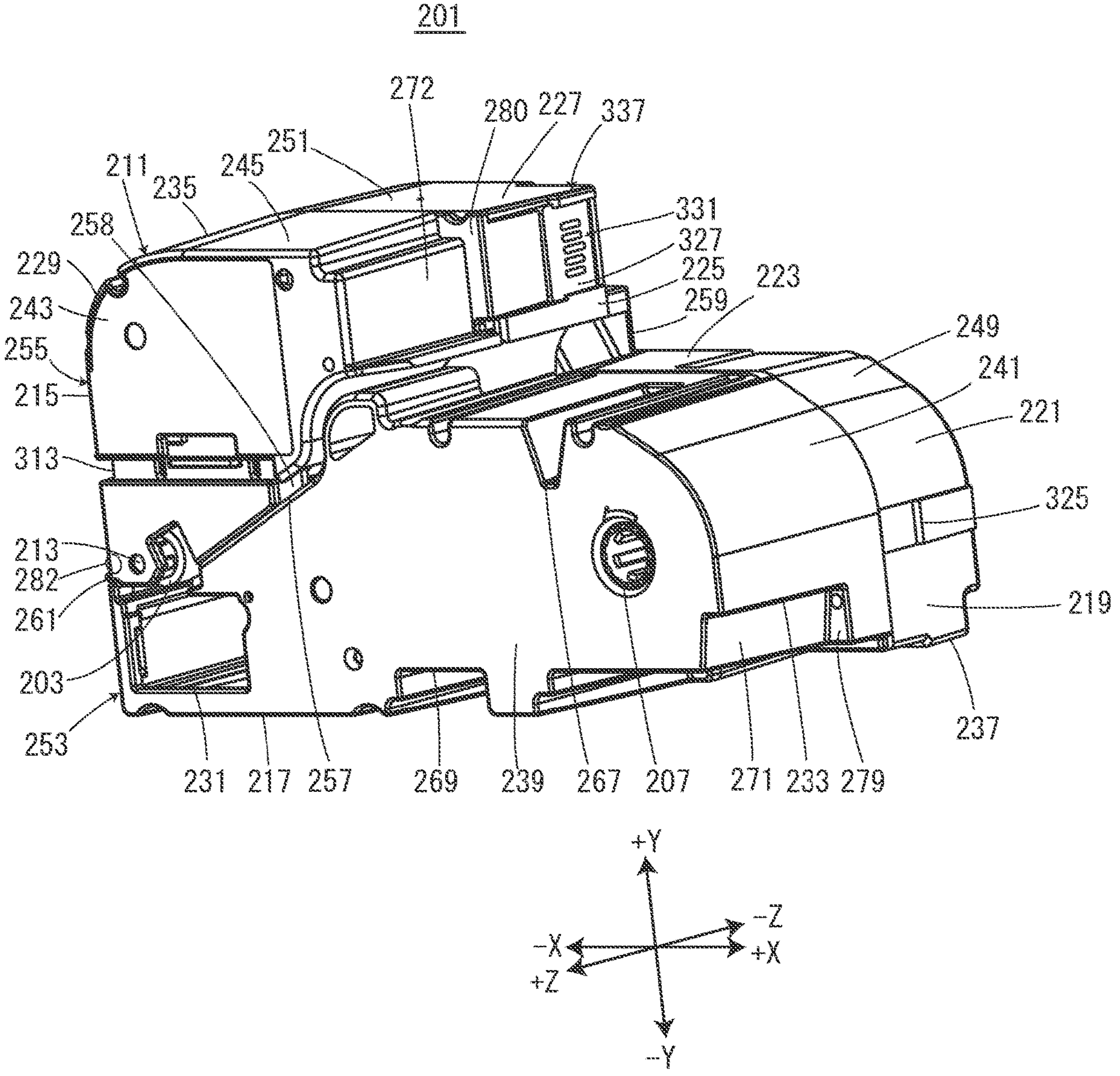
FIG. 6 is a perspective view of the ribbon cartridge.
Figure 7:
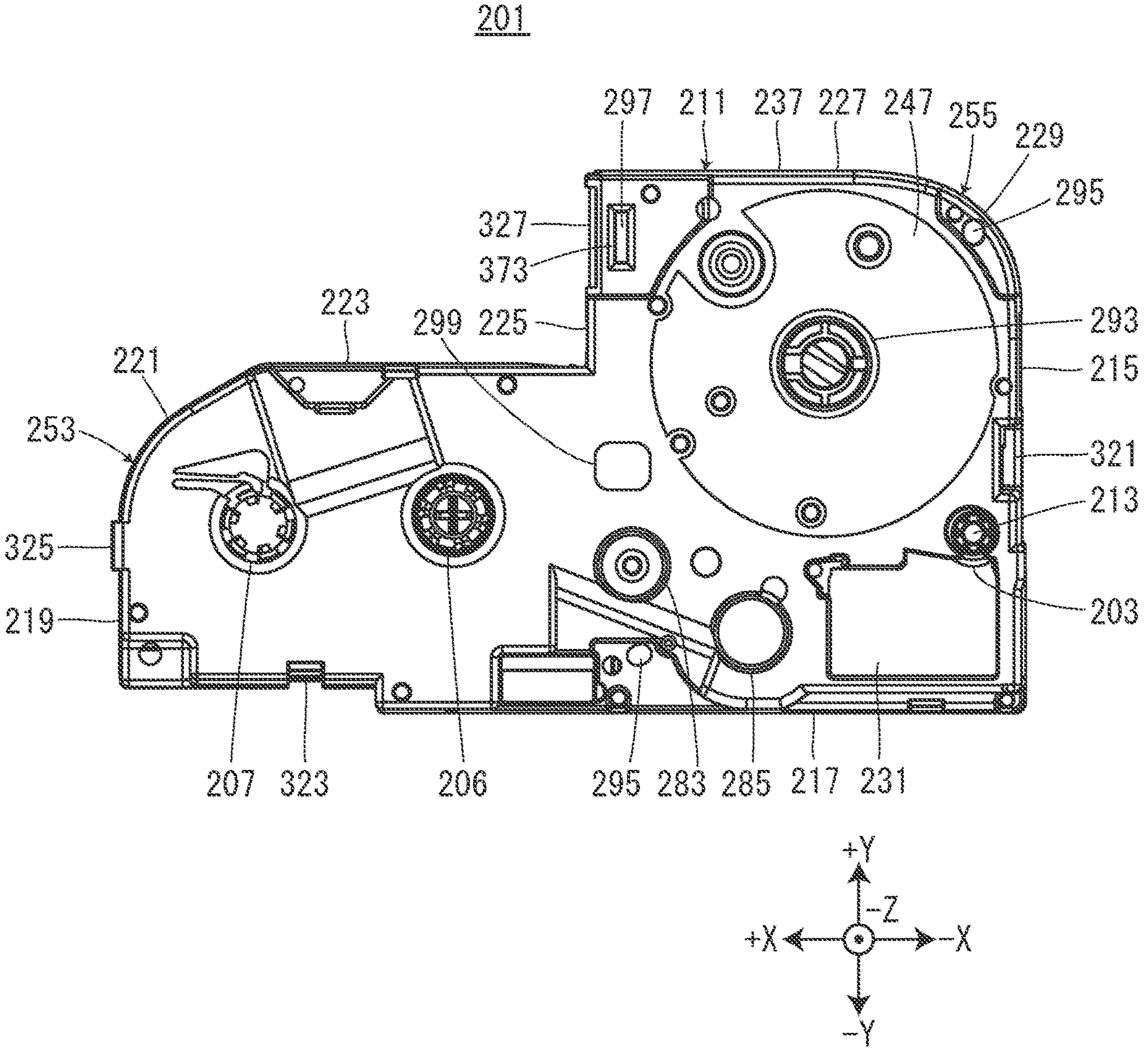
FIG. 7 is a view of the ribbon cartridge when seen from a back side in the installation direction.

The ribbon cartridge 201 will be described on the basis of FIGS. 5 to 7. The ribbon cartridge 201 includes the second platen roller 203, a second paying-out core 206, a second winding core 207, a retention tip end 209, and a second cartridge case 211 that accommodates the second platen roller 203, the second paying-out core 206, the second winding core 207, and the retention tip end 209. Note that in the present embodiment, the ribbon cartridge 201 has a longitudinal direction in the X direction and a widthwise direction in the Y direction when seen from the front side in the installation direction.

The second platen roller 203, the second paying-out core 206, and the second winding core 207 are, when seen from the front side in the installation direction, provided at positions corresponding to the platen shaft 39, the second paying-out shaft 45, and the second winding shaft 47 provided in the cartridge installation part 7, respectively. The second platen roller 203 has a second platen shaft insertion hole 213 penetrating in the installation direction. The second ink ribbon 205 is wound on the second paying-out core 206. A paying-out-side roll 280 is one obtained by winding the second ink ribbon on the second paying-out core 206. The second ink ribbon 205 that has been paid out from the second paying-out core 206 is wound up by the second winding core 207. A winding-side roll 210 is one obtained by winding the second ink ribbon 205 on the second winding core 207. In FIG. 5, the paying-out-side roll 208 in a state in which the whole second ink ribbon 205 is wound on the second paying-out core 206 is shown by broken lines, and a winding-side roll 210 in a state in which the whole second ink ribbon 205 is wound on the second paying-out core 206 is imaginarily shown by two-dot chain lines. Similarly, in FIGS. 10 and 12, the paying-out-side roll 208 in a state in which the whole second ink ribbon 205 is wound on the second paying-out core 206 is shown by a solid line, and the winding-side roll 210 in a state in which the whole second ink ribbon 205 is wound on the second paying-out core 206 is imaginarily shown by two-dot chain lines. Note that the second cartridge case 211 includes a plurality of types having different thicknesses, i.e., different dimensions in the installation direction depending on the width of the accommodated second ink ribbon 205.

The second cartridge case 211 is, when seen from the front side in the installation direction, formed into a shape substantially similar to the cartridge installation part 7. In the peripheral wall part of the second cartridge case 211, a peripheral wall part on the −X side is defined as a ribbon-side first peripheral wall part 215. A peripheral wall part extending to the +X side from the end on the −Y side of the ribbon-side first peripheral wall part 215 is defined as a ribbon-side second peripheral wall part 217. A peripheral wall part extending to the +Y side from the end on the +X side of the ribbon-side second peripheral wall part 217 is defined as a ribbon-side third peripheral wall part 219. A peripheral wall part extending to the −X side via a first curvature surface 221 from the end on the +Y side of the ribbon-side third peripheral wall part 219 is defined as a ribbon-side fourth peripheral wall part 223. A peripheral wall part extending to the +Y side from the end on the −X side of the ribbon-side fourth peripheral wall part 223 is defined as a ribbon-side fifth peripheral wall part 225. A peripheral wall part extending to the −X side from the end on the +Y side of the ribbon-side fifth peripheral wall part 225 is defined as a ribbon-side sixth peripheral wall part 227. The end on the −X side of the ribbon-side sixth peripheral wall part 227 is connected to the end on the +Y side of the ribbon-side first peripheral wall part 215 via a second curvature surface 229. Between the ribbon-side fourth peripheral wall part 223 and the ribbon-side sixth peripheral wall part 227, a step is formed by the ribbon-side fifth peripheral wall part 225. Further, an internal angle $\alpha$ formed between the ribbon-side fourth peripheral wall part 223 and the ribbon-side fifth peripheral wall part 225 exceeds 180° and is, for example, approximately 270° when seen from the front side in the installation direction.

Figure 10:
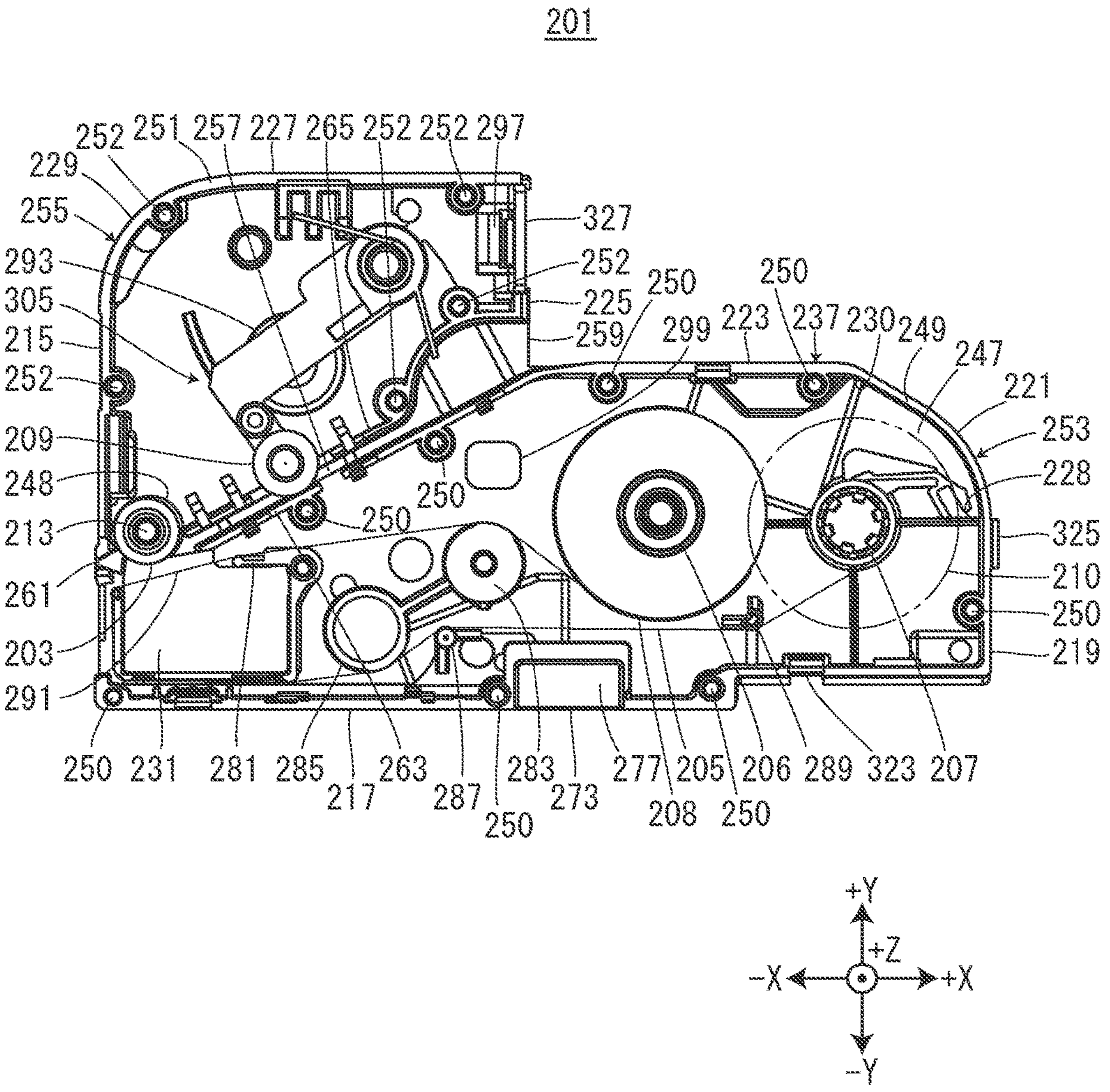
FIG. 10 is a view of the ribbon cartridge with the ribbon-part front-side case, the tape-retention-part front-side case, and a slide plate removed therefrom in a state in which the slide plate is moved to a closing position when seen from the front side in the installation direction.

As shown in FIG. 10, a portion facing one end of the second winding core 207 in the longitudinal direction of the ribbon cartridge 201, i.e., an end on the +X side of the second winding core 207 in the peripheral wall part of the second cartridge case 211 is defined as a first facing portion 228. Further, a portion facing one end of the second winding core 207 in a direction orthogonal to the longitudinal direction of the ribbon cartridge 201, i.e., an end on the +Y side of the second winding core 207 in the peripheral wall part of the second cartridge case 211 is defined as a second facing portion 230. The first curvature surface 221 is, when seen from the front side in the installation direction, positioned between the first facing portion 228 and the second facing portion 230 and formed into an arc shape protruding toward the outside of the ribbon cartridge 201. Thus, it is possible to reduce the gap between the winding-side roll 210 and the peripheral wall part of the second cartridge case 211.

The second cartridge case 211 has a second head insertion hole 231 provided to penetrate in the installation direction. The second head insertion hole 231 is, when seen from the front side in the installation direction, positioned at a corner part at which the ribbon-side first peripheral wall part 215 and the ribbon-side second peripheral wall part 217 cross each other. The second head insertion hole 231 is arranged along the ribbon-side first peripheral wall part 215 and the ribbon-side second peripheral wall part 217. The second head insertion hole 231 is, when seen from the front side in the installation direction, formed into a shape corresponding to the head cover 56, i.e., a substantially rectangular shape. When the ribbon cartridge 201 is attached to and detached from the cartridge installation part 7, the second head insertion hole 231 and the second platen shaft insertion hole 213 position the ribbon cartridge 201 and guide the attachment and detachment of the ribbon cartridge 201.

The second cartridge case 211 includes a front-side case and a second back-side case 237. The front-side case is divided into a ribbon-part front-side case 233 and a tape-retention-part front-side case 235. Note that the ribbon-part front-side case 233 is an example of a first case, and the second back-side case 237 is an example of a second case. When the ribbon cartridge 201 is installed in the cartridge installation part 7, the ribbon-part front-side case 233 and the tape-retention-part front-side case 235 are arranged on the front side in the installation direction, while the second back-side case 237 is arranged on the back side in the installation direction. The ribbon-part front-side case 233 and the tape-retention-part front-side case 235 are resin-molded articles having translucency, and the second back-side case 237 is a resin-molded article having no translucency. However, the materials and manufacturing methods of the ribbon-part front-side case 233, the tape-retention-part front-side case 235, and the second back-side case 237 are not limited to those described above.

The ribbon-part front-side case 233 includes a ribbon-part front-side wall part 239 and a ribbon-part front-side peripheral wall part 241 protruding to the back side in the installation direction from the peripheral edge part of the ribbon-part front-side wall part 239. The tape-retention-part front-side case 235 includes a tape-retention-part front-side wall part 243 and a tape-retention-part front-side peripheral wall part 245 protruding to the back side in the installation direction from the peripheral edge part of the tape-retention-part front-side wall part 243. The second back-side case 237 includes a second back wall part 247 and a ribbon-part back-side peripheral wall part 249 and a tape-retention-part back-side peripheral wall part 251 protruding to the front side in the installation direction from the second back wall part 247.

Figure 8:
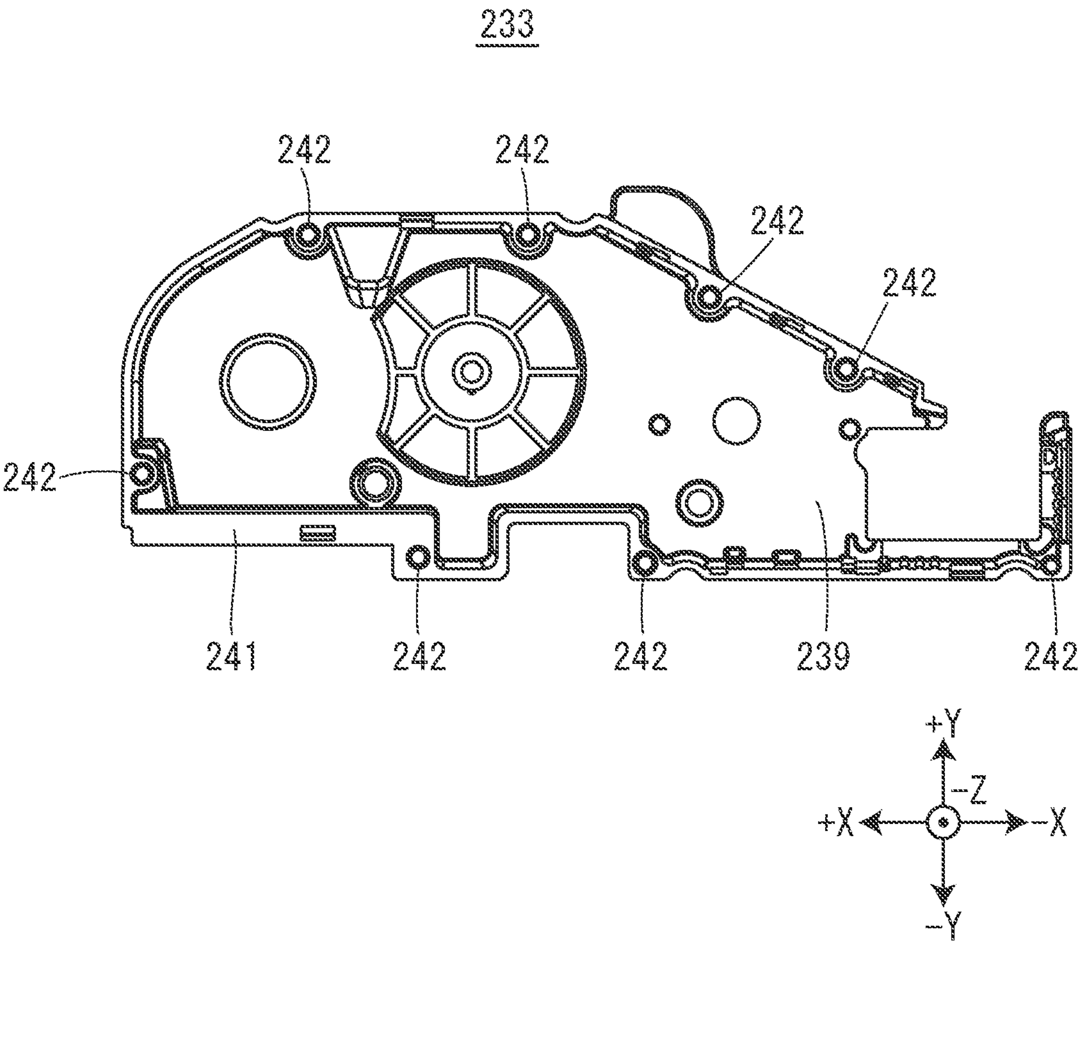
FIG. 8 is a view of a ribbon-part front-side case when seen from the back side in the installation direction.

The ribbon-part front-side case 233 and the second back-side case 237 are combined together so as to make the ribbon-part front-side peripheral wall part 241 and the ribbon-part back-side peripheral wall part 249 butted against each other, and constitute the outer shell of an ink ribbon accommodation part 253 that accommodates the second ink ribbon 205. That is, the ribbon-part front-side peripheral wall part 241 has a plurality of ribbon-part insertion pins 242 (see FIG. 8) protruding to the back side in the installation direction, and the ribbon-part back-side peripheral wall part 249 has a plurality of ribbon-part insertion holes 250 (see FIG. 10) open to the front side in the installation direction. The ribbon-part front-side case 233 and the second back-side case 237 are combined together by the insertion of the ribbon-part insertion pins 242 into the ribbon-part insertion holes 250. Here, the ribbon-part insertion pins 242 and the ribbon-part insertion holes 250 are provided so as to avoid the first curvature surface 221. Therefore, compared with a configuration in which the ribbon-part insertion pins 242 and the ribbon-part insertion holes 250 are provided at the first curvature surface 221, it is possible to further reduce the gap between the winding-side roll 210 and the peripheral wall part of the second cartridge case 211.

Figure 9:
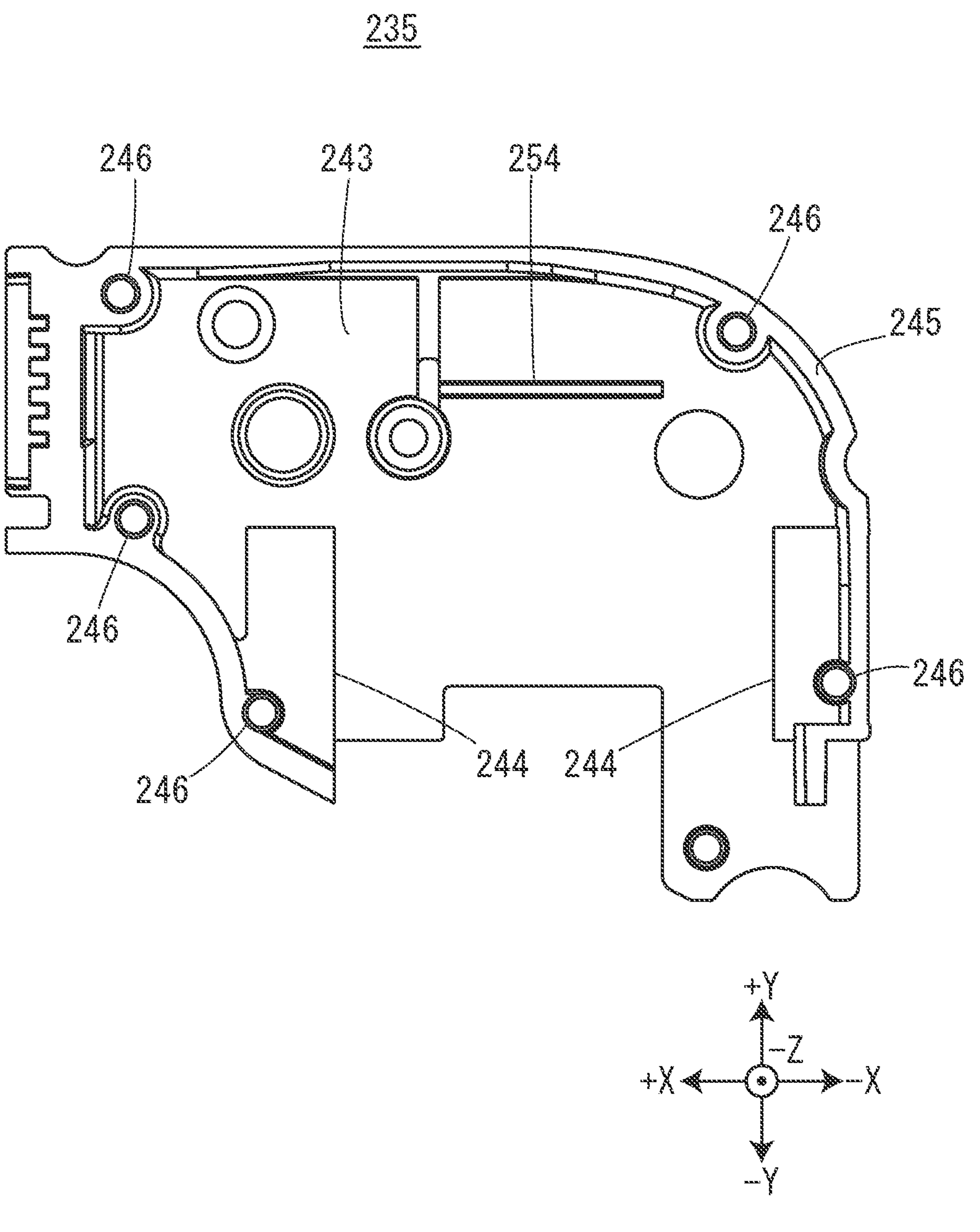
FIG. 9 is a view of a tape-retention-part front-side case when seen from the back side in the installation direction.

The tape-retention-part front-side case 235 and the second back-side case 237 are combined together so as to make the tape-retention-part front-side peripheral wall part 245 and the tape-retention-part back-side peripheral wall part 251 butted against each other, and constitute the outer shell of a tape-retention-mechanism accommodation part 255 that accommodates the second platen roller 203 and the retention tip end 209. That is, the tape-retention-part front-side peripheral wall part 245 has a plurality of retention-part insertion pins 246 (see FIG. 9) protruding to the back side in the installation direction, and the tape-retention-part back-side peripheral wall part 251 has a plurality of retention-part insertion holes 252 (see FIG. 10) open to the front side in the installation direction. The tape-retention-part front-side case 235 and the second back-side case 237 are combined together by the insertion of the retention-part insertion pins 246 into the retention-part insertion holes 252. The ink ribbon accommodation part 253 and the tape-retention-mechanism accommodation part 255 are integrally formed via the second back wall part 247.

Note that a tape retention part 305 (see FIG. 10) including the retention tip end 209 is accommodated in the tape-retention-mechanism accommodation part 255. The tape retention part 305 is used to retain the second printing tape 403 that has been introduced in advance into the second tape path 257 that will be described later when the ribbon cartridge 201 is installed in the cartridge installation part 7. That is, the retention tip end 209 sandwiches the second printing tape 403 that has been introduced into the second tape path 257 between the retention tip end 209 and the ribbon-side path lateral wall part 263. Thus, the tip end of the second printing tape 403 that has been introduced into the second tape path 257 is prevented from being pulled in the second tape path 257, i.e., the side of the cartridge-side tape introduction port 259 rather than being pulled in the second platen roller 203.

The ribbon-part front-side case 233 has a first peripheral wall concave part 267, a second peripheral wall concave part 269, a third peripheral wall concave part 271, and a fourth peripheral wall concave part 272. The first peripheral wall concave part 267 is formed into a concave shape from the ribbon-part front-side wall part 239 to the back side in the installation direction at the end on the +X side of the ribbon-side fourth peripheral wall part 223. The second peripheral wall concave part 269 is formed into a groove shape extending in the installation direction at the substantially intermediate part in the X direction of the ribbon-side second peripheral wall part 217. The third peripheral wall concave part 271 is formed into a concave shape from the ribbon-part front-side wall part 239 to the back side in the installation direction at the end on the −Y side of the ribbon-side third peripheral wall part 219. The fourth peripheral wall concave part 272 is formed into a concave shape from the tape-retention-part front-side wall part 243 to the back side in the installation direction at the end on the +Y side of the ribbon-side fifth peripheral wall part 225. Further, the ribbon-part back-side peripheral wall part 249 has a peripheral wall convex part 273 provided to protrude to the front side in the installation direction at its position corresponding to the second peripheral wall concave part 269.

Here, the bottom surface of the first peripheral wall concave part 267, the protrusion tip end surface of the peripheral wall convex part 273, and the bottom surface of the third peripheral wall concave part 271 are defined as a first pressing part 275, a second pressing part 277, and a third pressing part 279, respectively. The first pressing part 275, the second pressing part 277, and the third pressing part 279 are, when seen from the front side in the installation direction, provided to surround the second paying-out core 206 and the second winding core 207. The first pressing part 275, the second pressing part 277, and the third pressing part 279 are provided at positions corresponding to the first pressing protrusion 19, the second pressing protrusion 20, and the third pressing protrusion 21 provided on the installation-part cover 5, respectively. Further, the bottom surface of the fourth peripheral wall concave part 272 and the surface on the front side in the installation direction on the +Z side of the cartridge-side tape ejection port 261 are defined as a fourth pressing part 280 and a fifth pressing part 282, respectively. The fourth pressing part 280 and the fifth pressing part 282 are provided at positions corresponding to the fourth pressing protrusion 22 and the fifth pressing protrusion 23 provided on the installation-part cover 5, respectively.

When the installation-part cover 5 is closed in a state in which the ribbon cartridge 201 is installed in the cartridge installation part 7, the first pressing protrusion 19, the second pressing protrusion 20, and the third pressing protrusion 21 provided on the installation-part cover 5 are guided by the first peripheral wall concave part 267, the second peripheral wall concave part 269, and the third peripheral wall concave part 271, respectively, and butted against the first pressing part 275, the second pressing part 277, and the third pressing part 279, respectively. That is, the peripheries of the second paying-out core 206 and the second winding core 207 are pressed by the first pressing protrusion 19, the second pressing protrusion 20, and the third pressing protrusion 21. Thus, the second paying-out core 206 and the second winding core 207 are prevented from being inclined with respect to the second paying-out shaft 45 and the second winding shaft 47 provided in the cartridge installation part 7, respectively. Accordingly, it is possible to prevent the second ink ribbon 205 from becoming wrinkled when the second ink ribbon 205 is fed from the second paying-out core 206 to the second winding core 207.

Note that the ribbon cartridge 201 is allowed to accommodate an ink ribbon having a large ink ribbon width, for example, an ink ribbon having a width of 50 mm. Meanwhile, in order to accommodate an ink ribbon having an ink ribbon width smaller than 50 mm, for example, an ink ribbon having a width of 24 mm or less, the ribbon cartridge 201 may be one in which the ribbon-part front-side case 233 and the tape-retention-part front-side case 235 are reduced in dimension in the Z direction. At this time, both or any one of the first pressing protrusion 19 and the third pressing protrusion 21 may press the ribbon-part front-side wall part 239 without the provision of both or any one of the first peripheral wall concave part 267 and the third peripheral wall concave part 271.

Further, when the installation-part cover 5 is closed in a state in which the ribbon cartridge 201 is installed in the cartridge installation part 7, the fourth pressing protrusion 22 provided on the installation-part cover 5 is guided by the fourth peripheral wall concave part 272 and butted against the fourth pressing part 280. Thus, the fourth pressing part 280 is pressed to the back side in the installation direction by the fourth pressing protrusion 22 to allow a second electrode part 330 of a second circuit substrate 327 provided in the vicinity of the fourth pressing part 280 to properly come in contact with contact terminal parts 83. Further, when the installation-part cover 5 is closed in a state in which the ribbon cartridge 201 is installed in the cartridge installation part 7, the fifth pressing protrusion 23 provided on the installation-part cover 5 is butted against the fifth pressing part 282. Thus, the fifth pressing part 282 is pressed to the back side in the installation direction by the fifth pressing protrusion 23 to allow the second platen roller 203 provided in the vicinity of the fifth pressing part 282 to properly face the printing head 55.

In the ribbon-part back-side peripheral wall part 249, the ribbon-side first peripheral wall part 215 has a ribbon-side first hook engagement part 321, a ribbon-side second peripheral wall part 217 has a ribbon-side second hook engagement part 323, and the ribbon-side third peripheral wall part 219 has a ribbon-side third hook engagement part 325. In a state in which the ribbon cartridge 201 is installed in the cartridge installation part 7, the ribbon-side first hook engagement part 321, the ribbon-side second hook engagement part 323, and the ribbon-side third hook engagement part 325 provided in the ribbon cartridge 201 engage the first hook 57, the third hook 61, and the fourth hook 63 provided in the cartridge installation part 7, respectively. Thus, the ribbon cartridge 201 is prevented from being installed in a state of floating from the installation bottom surface 37.

On the other hand, the second back wall part 247 has a hook insertion hole 299 formed on the +Y side of a paying-out-side cylindrical part 283 that will be described later. In a state in which the ribbon cartridge 201 is installed in the cartridge installation part 7, the second hook 59 provided in the cartridge installation part 7 is inserted into the hook insertion hole 299 provided on the ribbon cartridge 201. Thus, the second hook 59 is prevented from interfering with the ribbon cartridge 201 when the ribbon cartridge 201 is installed in the cartridge installation part 7.

The second back wall part 247 has a plurality of second positioning holes 295 provided on its surface on the back side in the installation direction. In a state in which the ribbon cartridge 201 is installed in the cartridge installation part 7, the second positioning holes 295 provided on the ribbon cartridge 201 engage the positioning pins 65 provided in the cartridge installation part 7. Thus, the ribbon cartridge 201 is positioned with respect to the cartridge installation part 7.

Further, the second circuit substrate 327 is attached to the ribbon-side fifth peripheral wall part 225 in the ribbon-part back-side peripheral wall part 249. That is, the second circuit substrate 327 is attached to the ribbon-side fifth peripheral wall part 225 provided to be substantially parallel to the ribbon-side first peripheral wall part 215 having the cartridge-side tape ejection port 261. The ribbon-side fifth peripheral wall part 225 has a second substrate attachment part 337 to which the second circuit substrate 327 is attached.

As described above, the ribbon-side fifth peripheral wall part 225 is, when seen from the front side in the installation direction, bent with the internal angle $\alpha$ exceeding 180° with respect to the ribbon-side fourth peripheral wall part 223. Therefore, when the ribbon cartridge 201 falls down onto a floor or the like, the first curvature surface 221 between the ribbon-side third peripheral wall part 219 and the ribbon-side fourth peripheral wall part 223 or a corner part at which the ribbon-side fifth peripheral wall part 225 and the ribbon-side sixth peripheral wall part 227 cross each other are butted against the floor or the like, while the ribbon-side fourth peripheral wall part 223 and the ribbon-side fifth peripheral wall part 225 are prevented from being butted against the floor or the like. Accordingly, when the ribbon cartridge 201 falls down onto a floor or the like, the second electrode part 330 provided on the second circuit substrate 327 is prevented from being butted against the floor or the like. As a result, it is possible to prevent the second electrode part 330 having weak mechanical strength from being damaged. Note that the same function and effect are obtainable even with a configuration in which the second circuit substrate 327 is attached to the ribbon-side fourth peripheral wall part 223.

A second tape path 257 will be described on the basis of FIGS. 5, 6, and 10. The second tape path 257 is positioned between the ribbon-part front-side case 233 and the tape-retention-part front-side case 235, and formed into a groove shape having an opening on the front side in the installation direction. That is, a set opening part 258 is provided on the front side in the installation direction of the second tape path 257. The set opening part 258 is used when a user sets the second printing tape 403 in the second tape path 257 from the end surface on the back side in the installation direction of the second printing tape 403. A part of the set opening part 258 is opened and closed when a slide plate 313 is slid in the Y direction with respect to the tape-retention-part front-side wall part 243.

The second tape path 257 connects a cartridge-side tape introduction port 259 provided on the ribbon-side fifth peripheral wall part 225 and the cartridge-side tape ejection port 261 provided on the ribbon-side first peripheral wall part 215 to each other. Note that the cartridge-side tape introduction port 259 is provided between the ink ribbon accommodation part 253 and the second circuit substrate 327. That is, the cartridge-side tape introduction port 259 is positioned on a side closer to the ribbon-side fourth peripheral wall part 223 than the second circuit substrate 327. In FIGS. 5 and 10, the cartridge-side tape introduction port 259 is provided at a region crossing the ribbon-side fourth peripheral wall part 223 at a distance from the second circuit substrate 327 of the ribbon-side fifth peripheral wall part 225. The cartridge-side tape introduction port 259 may be provided on the ribbon-side fourth peripheral wall part 223. In this case, in order to make a simple arrangement structure, the cartridge-side tape introduction port 259 is preferably close to a region crossing the ribbon-side fifth peripheral wall part 225 and the ribbon-side fourth peripheral wall part 223.

The cartridge-side tape introduction port 259 introduces the second printing tape 403 that has been introduced from the device-side tape introduction port 9 into the second cartridge case 211 in a state in which the ribbon cartridge 201 is installed in the cartridge installation part 7. The cartridge-side tape ejection port 261 ejects the second printing tape 403 to the outside of the second cartridge case 211 toward the device-side tape ejection port 11 in a state in which the ribbon cartridge 201 is installed in the cartridge installation part 7. The cartridge-side tape introduction port 259 and the cartridge-side tape ejection port 261 are formed into a slit shape along the installation direction. Therefore, the second printing tape 403 that has been introduced into the second cartridge case 211 is fed with its width direction substantially parallel to the installation direction.

In the lateral wall part of the second tape path 257, the lateral wall part on the side of the ink ribbon accommodation part 253 and the lateral wall part on the side of the tape-retention-mechanism accommodation part 255 are defined as a ribbon-side path lateral wall part 263 and a tape-retention-mechanism-side path lateral wall part 265, respectively. The ribbon-side path lateral wall part 263 and the tape-retention-mechanism-side path lateral wall part 265 face each other.

On the second tape path 257, the second platen roller 203 and the retention tip end 209 are provided in an order close to the cartridge-side tape ejection port 261. In the tape-retention-mechanism-side path lateral wall part 265, a portion corresponding to the retention tip end 209 is notched so that the retention tip end 209 is capable of retaining the second printing tape 403 that has been introduced into the second tape path 257 between the retention tip end 209 and the ribbon-side path lateral wall part 263. Further, the end on the side of the cartridge-side tape ejection port 261 of the second tape path 257 is connected to the second head insertion hole 231 via a second ribbon exposure part 291 that will be described later.

The second back-side case 237 will be described on the basis of FIG. 10. The second back-side case 237 has, on the second back wall part 247, a second head peripheral edge convex part 281, a paying-out-side cylindrical part 283, a winding-side cylindrical part 285, a first ribbon guide 287, and a second ribbon guide 289 provided to protrude to the front side in the installation direction. The second head peripheral edge convex part 281 is provided at the peripheral edge part of the second head insertion hole 231. The second head peripheral edge convex part 281 is notched on the +Y side, i.e., at its part on the side of the second platen roller 203, and the notched portion serves as the second ribbon exposure part 291 at which the second ink ribbon 205 is exposed. Thus, in a state in which the ribbon cartridge 201 is installed in the cartridge installation part 7, the printing head 55 inserted into the second head insertion hole 231 faces the second platen roller 203 across the second ink ribbon 205 and the second printing tape 403.

The paying-out-side cylindrical part 283 and the winding-side cylindrical part 285 are, when seen from the front side in the installation direction, provided at positions corresponding to the first paying-out shaft 41 and the first winding shaft 43 provided in the cartridge installation part 7, respectively. In a state in which the ribbon cartridge 201 is installed in the cartridge installation part 7, the first paying-out shaft 41 and the first winding shaft 43 provided in the cartridge installation part 7 are inserted into the paying-out-side cylindrical part 283 and the winding-side cylindrical part 285 provided in the ribbon cartridge 201, respectively. Thus, the first paying-out shaft 41 and the first winding shaft 43 are prevented from interfering with the ribbon cartridge 201 when the ribbon cartridge 201 is installed in the cartridge installation part 7.

The second ink ribbon 205 that has been paid out from the second paying-out core 206 is wound up by the second winding core 207, while being guided by the paying-out-side cylindrical part 283, the second head peripheral edge convex part 281, the winding-side cylindrical part 285, the first ribbon guide 287, and the second ribbon guide 289 in this order. That is, the paying-out-side cylindrical part 283 and the winding-side cylindrical part 285 function as guide members that guide the second ink ribbon 205, besides receiving the first paying-out shaft 41 and the first winding shaft 43.

Further, the second back wall part 247 has a second cylindrical shaft part 293 provided to protrude to the front side in the installation direction. The second cylindrical shaft part 293 is formed into a substantially-stepped cylindrical shape. In a state in which the ribbon cartridge 201 is installed in the cartridge installation part 7, the insertion convex part 53 provided in the cartridge installation part 7 is inserted into the second cylindrical shaft part 293 provided in the ribbon cartridge 201.

The second back wall part 247 has a second convex-part reception part 297 at a corner part at which the ribbon-side fifth peripheral wall part 225 and the ribbon-side sixth peripheral wall part 227 cross each other. In a state in which the ribbon cartridge 201 is installed in the cartridge installation part 7, the second convex-part reception part 297 provided in the ribbon cartridge 201 receives the engagement convex part 51 provided in the cartridge installation part 7.

[Printing Processing Performed when Ribbon Cartridge is Installed]

Figure 11:
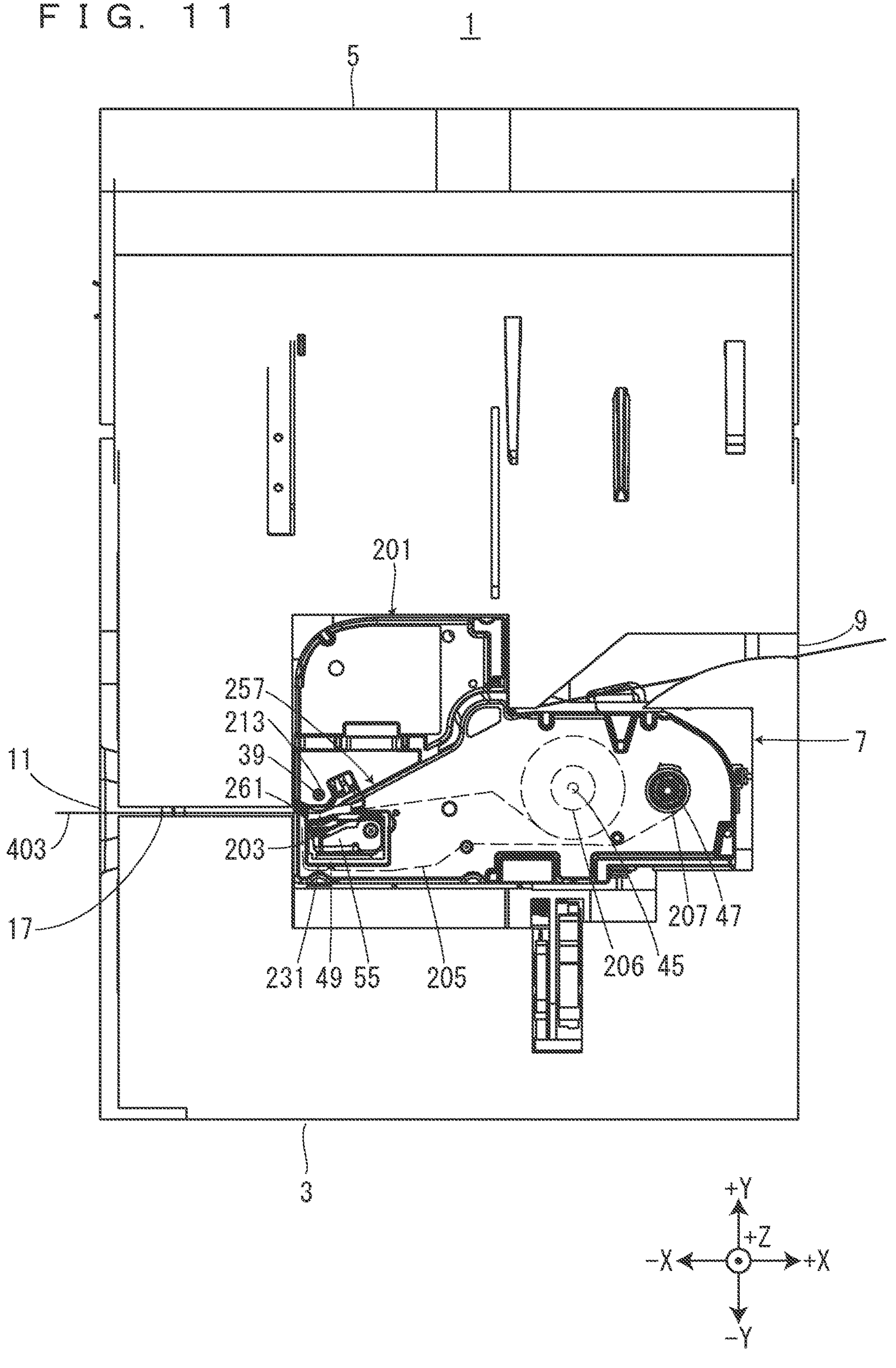
FIG. 11 is a view for describing printing processing performed by the tape printing device in a state in which the ribbon cartridge is installed in a cartridge installation part.

Printing processing performed by the tape printing device 1 in a state in which the ribbon cartridge 201 is installed in the cartridge installation part 7 will be described on the basis of FIG. 11. In a state in which the ribbon cartridge 201 is installed in the cartridge installation part 7, the platen shaft 39, the second paying-out shaft 45, and the second winding shaft 47 provided in the cartridge installation part 7 are inserted into the second platen shaft insertion hole 213 of the second platen roller 203, the second paying-out core 206, and the second winding core 207 provided in the ribbon cartridge 201, respectively. Thus, the driving force of a feeding motor provided in the tape printing device 1 becomes transmissible to the second platen roller 203, the second paying-out core 206, and the second winding core 207.

Further, in a state in which the ribbon cartridge 201 is installed in the cartridge installation part 7, the head part 49 provided in the cartridge installation part 7 is inserted into the second head insertion hole 231 provided on the ribbon cartridge 201. When the installation-part cover 5 is closed after the installation of the ribbon cartridge 201 in the cartridge installation part 7, the printing head 55 is caused to move to the platen shaft 39 by a head movement mechanism not shown. Thus, the second printing tape 403 and the second ink ribbon 205 are sandwiched between the printing head 55 and the second platen roller 203.

When the feeding motor rotates in a normal direction in this state, the second platen roller 203 rotates in a normal direction and the second winding core 207 rotates in a winding direction. Thus, the second printing tape 403 that has been introduced from the device-side tape introduction port 9 is fed to the device-side tape ejection port 11, and the second ink ribbon 205 that has been paid out from the second paying-out core 206 is wound up by the second winding core 207.

Further, when the feeding motor rotates in a reverse direction, the second platen roller 203 rotates in a reverse direction and the second paying-out core 206 rotates in a rewinding direction. Thus, the second printing tape 403 that has been ejected from the cartridge-side tape ejection port 261 is returned to the inside of the second cartridge case 211, and the second ink ribbon 205 that has been paid out from the second paying-out core 206 is rewound by the second paying-out core 206. As described above, the second paying-out shaft 45 inserted into the second paying-out core 206 and the second winding shaft 47 inserted into the second winding core 207 constitute a second ink ribbon transportation mechanism that feeds the second ink ribbon 205.

By rotating the feeding motor in the normal direction and heating the printing head 55, the tape printing device 1 prints printing information input via the keyboard or the like on the second printing tape 403 while feeding the second printing tape 403 and the second ink ribbon 205. After the completion of the printing, the tape printing device 1 causes the cutter 17 to perform a cutting operation to cut off a printed portion of the second printing tape 403. Then, by rotating the feeding motor in the reverse direction, the tape printing device 1 returns the second printing tape 403 until the tip end of the second printing tape 403 comes to the vicinity of a position at which the tip end is sandwiched between the printing head 55 and the second platen roller 203. Thus, it is possible to reduce a margin to be created on the front side in the length direction of the second printing tape 403 that is to be next printed.

[Details of Ribbon Cartridge]

Figure 12:
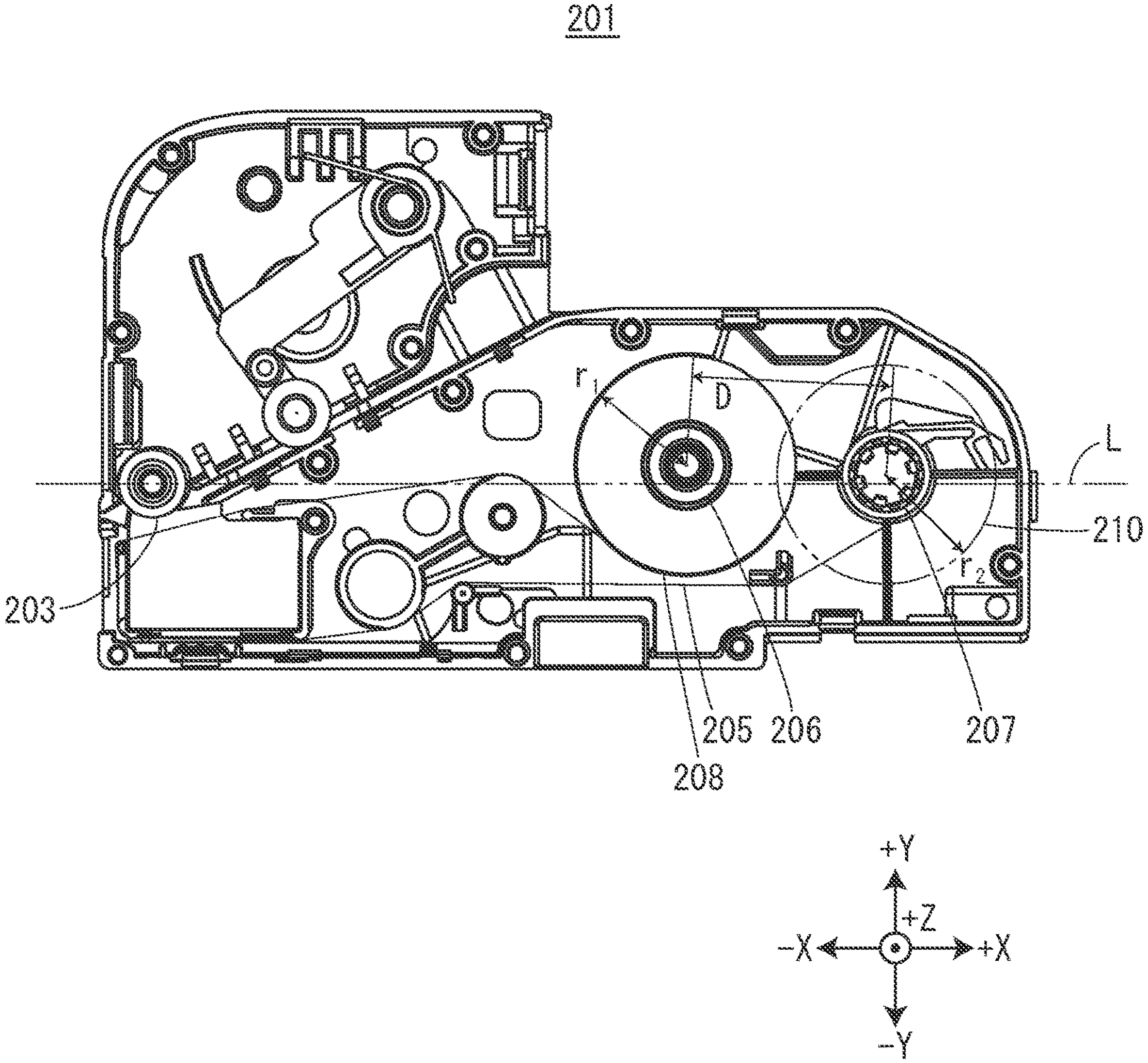
FIG. 12 is a view showing the arrangement of a second platen roller, a second paying-out core, and a second winding core in the ribbon cartridge.

The arrangement of the second platen roller 203, the second paying-out core 206, and the second winding core 207 in the ribbon cartridge 201 will be described on the basis of FIG. 12. In the ribbon cartridge 201, the second platen roller 203 is, when seen from the front side in the installation direction, provided close to one end, i.e., the end on the −X side in the longitudinal direction of the ribbon cartridge 201. On the other hand, the second paying-out core 206 and the second winding core 207 are, when seen from the front side in the installation direction, provided close to the other end, i.e., the end on the +X side in the longitudinal direction of the ribbon cartridge 201. Further, the second paying-out core 206 is provided between the second platen roller 203 and the second winding core 207 in the X direction. Here, the second paying-out core 206 is arranged closer to the second platen roller 203 than the second winding core 207. Thus, the dimension between the second paying-out core 206 and the second platen roller 203 is reduced. Therefore, it is possible to prevent the second ink ribbon 205 from becoming wrinkled between the second paying-out core 206 and the second platen roller 203.

Here, an imaginary line L, an inter-core dimension D, a maximum paying-out-side roll radius r1, a maximum winding-side roll radius r2, and a total roll value will be described. The imaginary line L is, when seen from a rotational axis direction parallel to the rotational axis of the second paying-out core 206 and the rotational axis of the second winding core 207, a line that extends in the longitudinal direction of the ribbon cartridge 201 and passes through the center of the second platen roller 203. Note that the rotational axis of the second paying-out core 206 and the rotational axis of the second winding core 207 are parallel to the installation direction in the present embodiment. Therefore, the rotational axis direction parallel to the rotational axes represents the installation direction. The inter-core dimension D is the dimension between the center of the second paying-out core 206 and the center of the second winding core 207. The maximum paying-out-side roll radius r1 is the radius of the paying-out side roll 208 in a state in which the whole second ink ribbon 205 is wound on the second paying-out core 206. The maximum winding-side roll radius r2 is the radius of the winding-side roll 210 in a state in which the whole second ink ribbon 205 is wound up by the second winding core 207. The total roll value is the total value of the maximum paying-out-side roll radius r1 and the maximum winding-side roll radius r2.

The second paying-out core 206 and the second winding core 207 are, when seen from the front side in the installation direction, arranged to at least partially overlap the imaginary line L. Therefore, the center of gravity of the ribbon cartridge 201 moves in a direction substantially parallel to the imaginary line L as the winding of the second ink ribbon 205 progresses. That is, the second platen roller 203 that is a heavy stuff is provided on a substantial extension line in the movement direction of the center of gravity. Therefore, the second platen roller 203 functions as a balancer, and the movement amount of the center of gravity of the ribbon cartridge 201 accompanied by the progress of the winding of the second ink ribbon 205 reduces. Thus, the second paying-out core 206 and the second winding core 207 are prevented from being inclined with respect to the second paying-out shaft 45 and the second winding shaft 47 provided in the cartridge installation part 7. Further, the ribbon cartridge 201 is not liable to be inclined with respect to the installation direction when the user attaches and detaches the ribbon cartridge 201. Therefore, the user is allowed to smoothly attach and detach the ribbon cartridge 201.

Further, the inter-core dimension D is smaller than the total roll value. That is, the second paying-out core 206 and the second winding core 207 are arranged adjacent to each other. Thus, it is possible to reduce the movement amount of the center of gravity of the ribbon cartridge 201 accompanied by the progress of the winding of the second ink ribbon 205. Further, it is possible to miniaturize the ribbon cartridge 201.

[Tape Cartridge]

Figure 13:
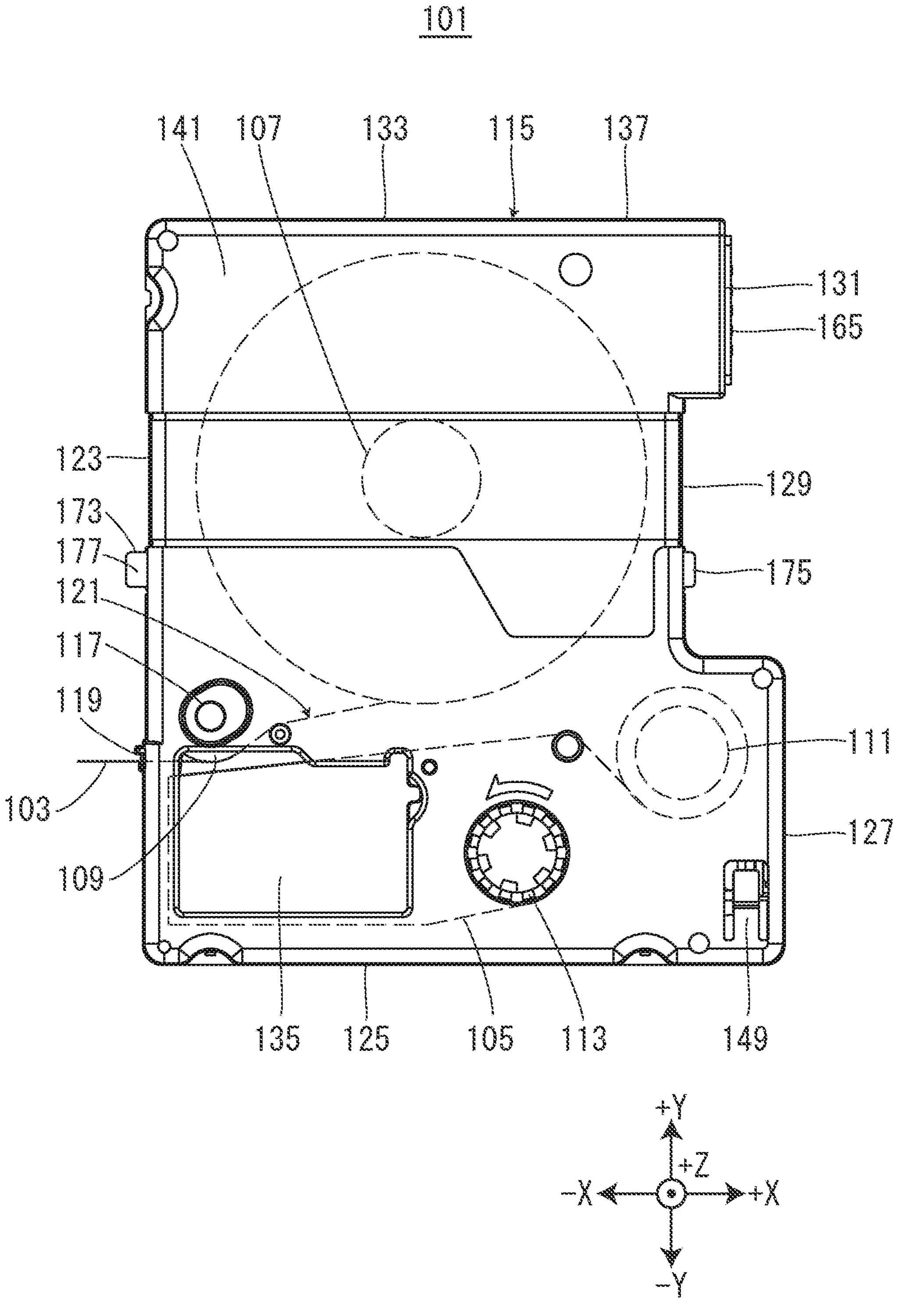
FIG. 13 is a view of the tape cartridge when seen from the front side in the installation direction.
Figure 14:
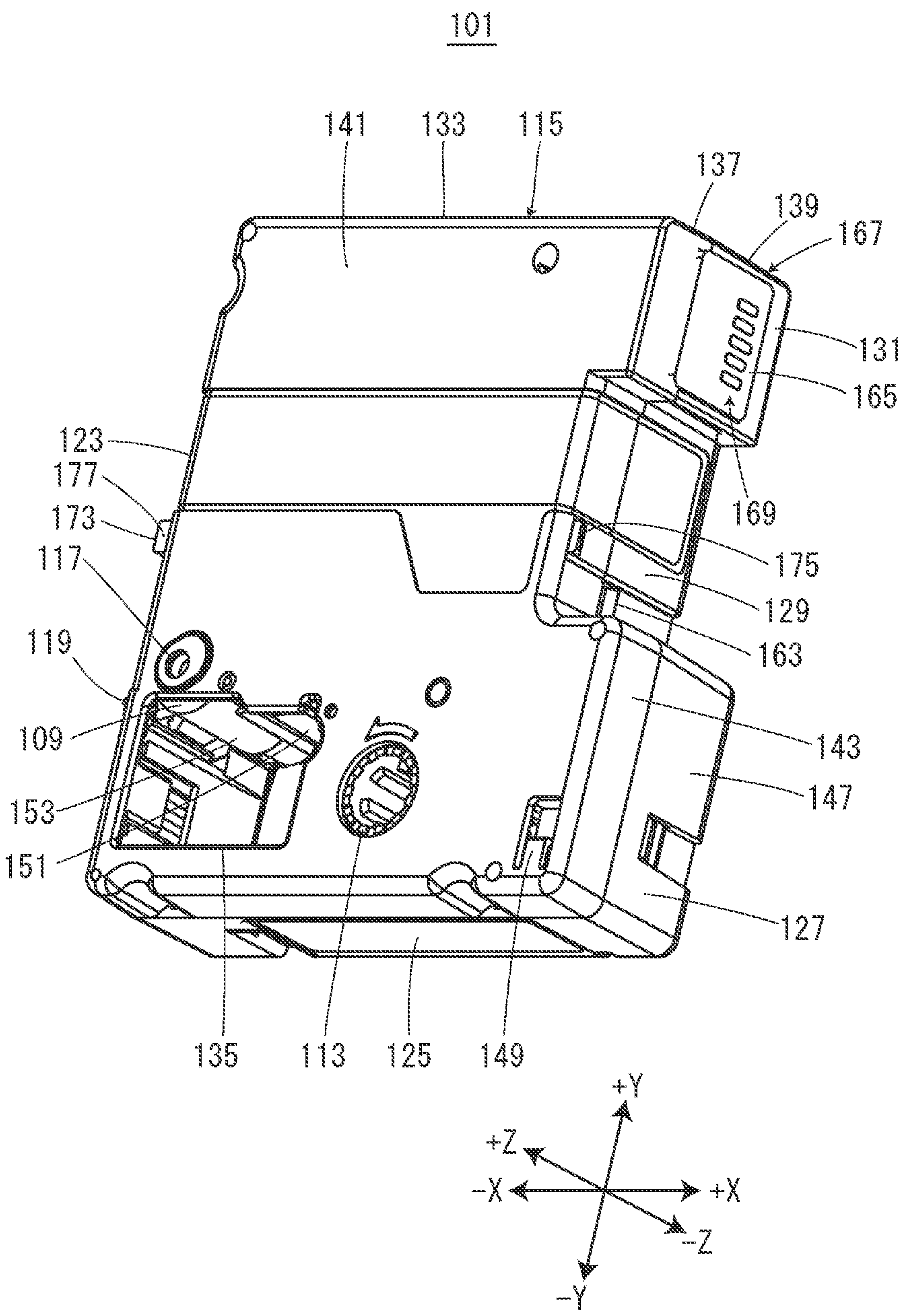
FIG. 14 is a perspective view of the tape cartridge.
Figure 15:
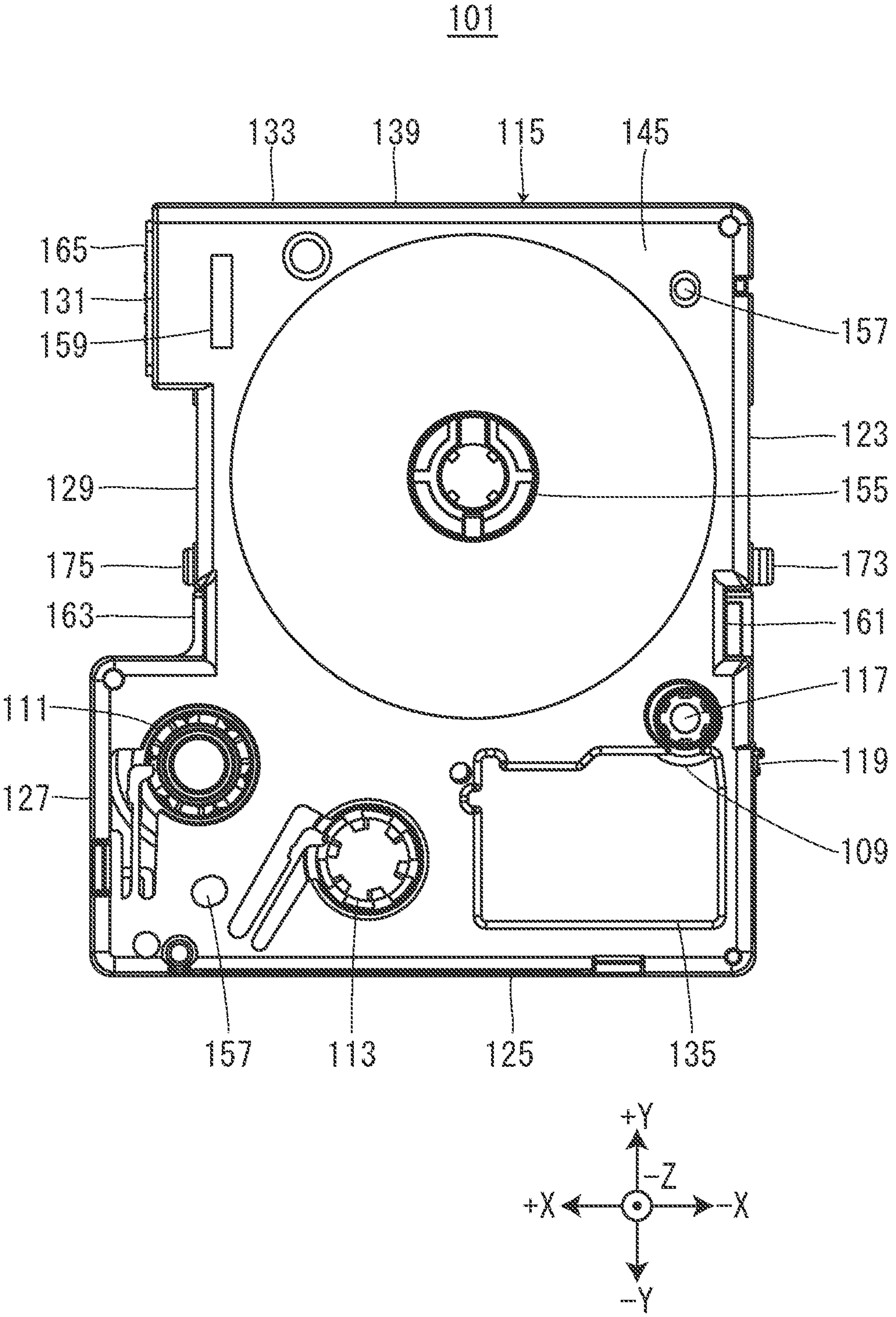
FIG. 15 is a view of the tape cartridge when seen from the back side in the installation direction.

The tape cartridge 101 will be described on the basis of FIGS. 13 to 15. The tape cartridge 101 includes a tape core 107, a first platen roller 109, a first paying-out core 111, a first winding core 113, and a first cartridge case 115 that rotatably accommodates the tape core 107, the first platen roller 109, the first paying-out core 111, and the first winding core 113. The tape core 107, the first platen roller 109, the first paying-out core 111, and the first winding core 113 are, when seen from the front side in the installation direction, provided at positions corresponding to the insertion convex part 53, the platen shaft 39, the first paying-out shaft 41, and the first winding shaft 43, provided in the cartridge installation part 7, respectively. The first platen roller 109 has a first platen shaft insertion hole 117 penetrating in the installation direction.

The first printing tape 103 is wound on the tape core 107. The first printing tape 103 that has been paid out from the tape core 107 is delivered to the outside of the first cartridge case 115 from a tape delivery port 119 provided on a tape-side first peripheral wall part 123 that will be described later. In the first cartridge case 115, a first tape path 121 ranging from the tape core 107 to the tape delivery port 119 is provided. The first ink ribbon 105 is wound on the first paying-out core 111. The first ink ribbon 105 that has been paid out from the first paying-out core 111 is wound up by the first winding core 113. Note that the first cartridge case 115 includes a plurality of types having different thicknesses, i.e., different dimensions in the installation direction depending on the widths of the accommodated first printing tape 103 and the first ink ribbon 105.

The first cartridge case 115 is, when seen from the front side in the installation direction, formed into a shape obtained by bending both ends of the long sides of a rectangle in the same direction and at a right angle. Here, in the peripheral wall part of the first cartridge case 115, a peripheral wall part on the −X side is defined as the tape-side first peripheral wall part 123. A peripheral wall part extending to the +X side from the end on the −Y side of the tape-side first peripheral wall part 123 is defined as a tape-side second peripheral wall part 125. Peripheral wall parts extending to the +Y side from the end on the +X side of the tape-side second peripheral wall part 125 are defined as a tape-side third peripheral wall part 127, a tape-side fourth peripheral wall part 129, and a tape-side fifth peripheral wall part 131 in an order from the −Y side. The tape-side fourth peripheral wall part 129 is formed into a concave shape with respect to the tape-side third peripheral wall part 127 and the tape-side fifth peripheral wall part 131. A peripheral wall part extending to the −X side from the end on the +Y side of the tape-side fifth peripheral wall part 131 is defined as a tape-side sixth peripheral wall part 133. The end on the −X side of the tape-side sixth peripheral wall part 133 is connected to the end on the +Y side of the tape-side first peripheral wall part 123.

The first cartridge case 115 has a first head insertion hole 135 provided to penetrate in the installation direction. The first head insertion hole 135 is, when seen from the front side in the installation direction, positioned at a corner part at which the tape-side first peripheral wall part 123 and the tape-side second peripheral wall part 125 cross each other. The first head insertion hole 135 is, when seen from the front side in the installation direction, formed into a shape corresponding to the head cover 56, i.e., a substantially rectangular shape. When the tape cartridge 101 is attached to and detached from the cartridge installation part 7, the first head insertion hole 135 and the first platen shaft insertion hole 117 position the tape cartridge 101 and guide the attachment and detachment of the tape cartridge 101.

The first cartridge case 115 includes a first front-side case 137 and a first back-side case 139. When the tape cartridge 101 is installed in the cartridge installation part 7, the first front-side case 137 and the first back-side case 139 are arranged on the front side and the back side in the installation direction, respectively. The first front-side case 137 is a resin-molded article having translucency, and the first back-side case 139 is a resin-molded article having no translucency. However, the materials and manufacturing methods of the first front-side case 137 and the first back-side case 139 are not limited to those described above.

The first front-side case 137 includes a first front-side wall part 141 and a first front-side peripheral wall part 143 protruding to the back side in the installation direction from the peripheral edge part of the first front-side wall part 141. The first back-side case 139 includes a first back wall part 145 and a first back-side peripheral wall part 147 protruding to the front side in the installation direction from the peripheral edge part of the first back wall part 145. The first front-side case 137 and the first back-side case 139 are combined together with the first front-side peripheral wall part 143 and the first back-side peripheral wall part 147 butted against each other.

The first front-side wall part 141 has an elastic part 149 at its corner part at which the tape-side second peripheral wall part 125 and the tape-side third peripheral wall part 127 cross each other. The elastic part 149 is, when seen from the front side in the installation direction, formed as a substantially rectangular part obtained by cutting off a part of the first front-side wall part 141 into a "U"-shape. When the installation-part cover 5 is closed in a state in which the tape cartridge 101 is installed in the cartridge installation part 7, the second pressing protrusion 20 provided on the installation-part cover 5 is butted against the elastic part 149 to cause the displacement of the elastic part 149 to the back side in the installation direction. A pressing force accompanied by the elastic displacement of the elastic part 149 is received by the second pressing protrusion 20. As a result, the tape cartridge 101 is pressed to the back side in the installation direction. Thus, the tape cartridge 101 is prevented from being installed in a state of floating from the installation bottom surface 37.

The first back wall part 145 has a first head peripheral edge convex part 151 provided to protrude to the front side in the installation direction from the peripheral edge part of the first head insertion hole 135. The first head peripheral edge convex part 151 has, on its +Y side, i.e., the side of the first platen roller 109, a first ribbon exposure part 153 at which the first ink ribbon 105 is exposed. However, in FIG. 14 showing the first ribbon exposure part 153, the first ink ribbon 105 is omitted. In a state in which the tape cartridge 101 is installed in the cartridge installation part 7, the printing head 55 that has been inserted into the first head insertion hole 135 faces the first platen roller 109 with the first ink ribbon 105 and the first printing tape 103 sandwiched between the printing head 55 and the first platen roller 109.

The first back wall part 145 has a first cylindrical shaft part 155 provided to protrude to the front side in the installation direction. The first cylindrical shaft part 155 is formed into a substantially-stepped cylindrical shape, and rotatably supports the tape core 107. In a state in which the tape cartridge 101 is installed in the cartridge installation part 7, the insertion convex part 53 provided in the cartridge installation part 7 is inserted into the first cylindrical shaft part 155 provided in the tape cartridge 101.

Further, the first back wall part 145 has, on its surface on the back side in the installation direction, a plurality of first positioning holes 157 provided to be on a diagonal line. In a state in which the tape cartridge 101 is installed in the cartridge installation part 7, the first positioning holes 157 provided on the tape cartridge 101 engage the positioning pins 65 provided in the cartridge installation part 7. Thus, the tape cartridge 101 is positioned with respect to the cartridge installation part 7.

In addition, the first back wall part 145 has a first convex-part reception part 159 at a position at which the tape-side fifth peripheral wall part 131 and the tape-side sixth peripheral wall part 133 cross each other. In a state in which the tape cartridge 101 is installed in the cartridge installation part 7, the first convex-part reception part 159 provided in the tape cartridge 101 receives the engagement convex part 51 provided in the cartridge installation part 7.

In the first back-side peripheral wall part 147, the tape-side first peripheral wall part 123 has a tape-side first hook engagement part 161, and the tape-side fourth peripheral wall part 129 has a tape-side second hook engagement part 163. In a state in which the tape cartridge 101 is installed in the cartridge installation part 7, the tape-side first hook engagement part 161 and the tape-side second hook engagement part 163 provided in the tape cartridge 101 engage the first hook 57 and the second hook 59 provided in the cartridge installation part 7, respectively. Thus, the tape cartridge 101 is prevented from being installed in a state of floating from the installation bottom surface 37. Further, in the first back-side peripheral wall part 147, the tape-side fifth peripheral wall part 131 has a first circuit substrate 165. That is, the first circuit substrate 165 is attached to the tape-side fifth peripheral wall part 131 provided to be substantially parallel to the tape-side first peripheral wall part 123 on which the tape delivery port 119 is provided. The tape-side fifth peripheral wall part 131 has a first substrate attachment part 167 to which the first circuit substrate 165 is attached.

A first gripping part 173 protrudes to the −X side from the tape-side first peripheral wall part 123, and a second gripping part 175 protrudes from the tape-side fourth peripheral wall part 129. The first gripping part 173 and the second gripping part 175 are, when seen from the front side in the installation direction, provided at a substantially intermediate part in the Y direction in the whole first cartridge case 115. The first gripping part 173 and the second gripping part 175 serve as hooking parts used when the user grips the tape cartridge 101. Here, the surface on the front side in the installation direction of the first gripping part 173 is defined as a sixth pressing part 177. When the installation-part cover 5 is closed in a state in which the ribbon cartridge 201 is installed in the cartridge installation part 7, the sixth pressing protrusion (see FIG. 2) provided on the installation-part cover 5 is butted against the sixth pressing part 177. Thus, the sixth pressing part 177 is pressed to the back side in the installation direction by the sixth pressing protrusion 24.

[Printing Processing Performed when Tape Cartridge is Installed]

Figure 16:
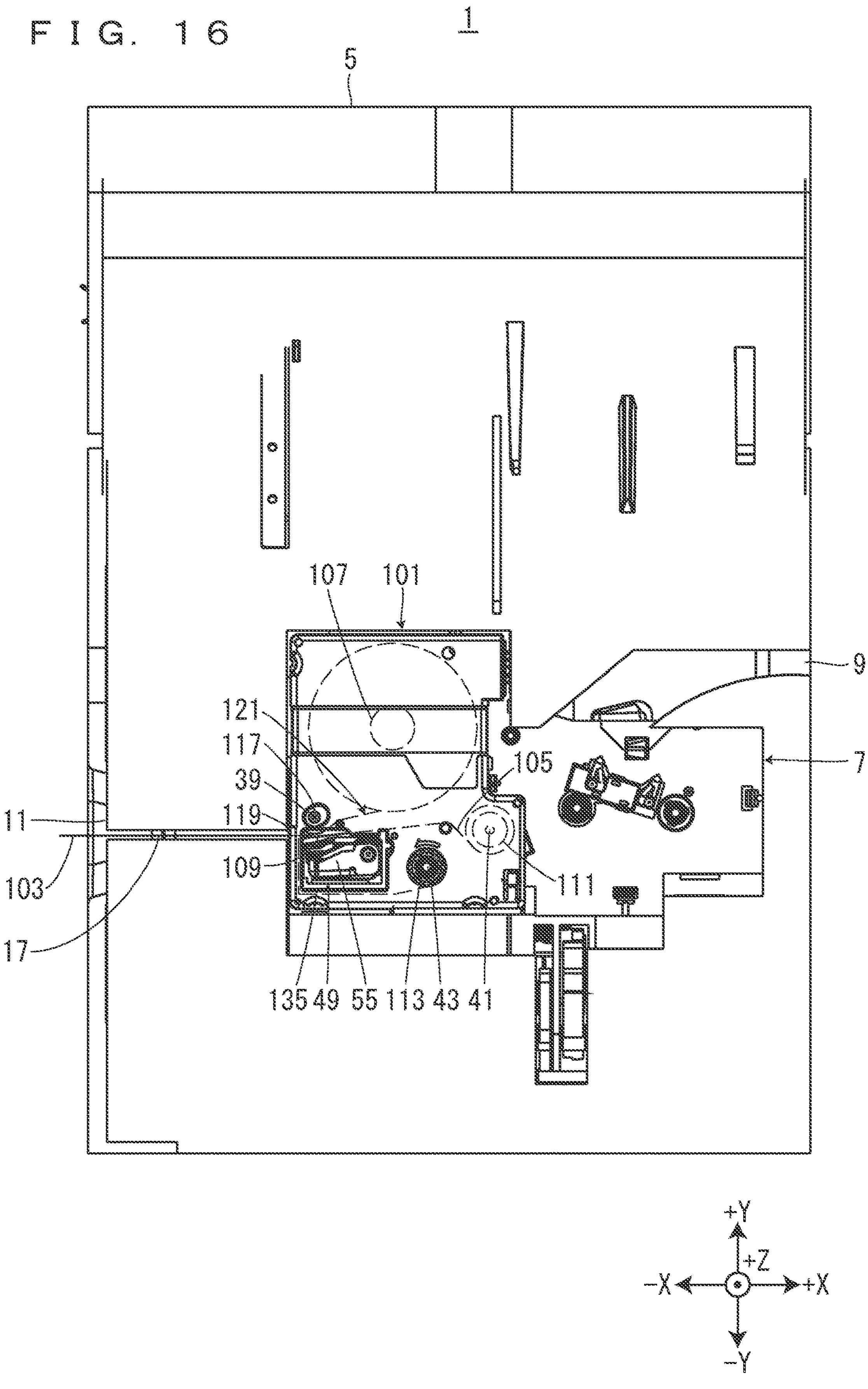
FIG. 16 is a view for describing printing processing performed by the tape printing device in a state in which the tape cartridge is installed in the cartridge installation part.

Printing processing performed by the tape printing device 1 in a state in which the tape cartridge 101 is installed in the cartridge installation part 7 will be described on the basis of FIG. 16. In a state in which the tape cartridge 101 is installed in the cartridge installation part 7, the platen shaft 39, the first paying-out shaft 41, and the first winding shaft 43 provided in the cartridge installation part 7 are inserted into the first platen shaft insertion hole 117 of the first platen roller 109, the first paying-out core 111, and the first winding core 113 provided in the tape cartridge 101, respectively. Thus, the driving force of the feeding motor (not shown in the figure) provided in the tape printing device 1 becomes transmissible to the first platen roller 109, the first paying-out core 111, and the first winding core 113.

Further, in a state in which the tape cartridge 101 is installed in the cartridge installation part 7, the head part 49 provided in the cartridge installation part 7 is inserted into the first head insertion hole 135 provided on the tape cartridge 101. When the installation-part cover 5 is closed after the installation of the tape cartridge 101 in the cartridge installation part 7, the printing head 55 is caused to move to the platen shaft 39 by the head movement mechanism (not shown in the figure). Thus, the first printing tape 103 and the first ink ribbon 105 are sandwiched between the printing head 55 and the first platen roller 109.

When the feeding motor rotates in a normal direction in this state, the first platen roller 109 rotates in the normal direction and the first winding core 113 rotates in a winding direction. Thus, the first printing tape 103 that has been paid out from the tape core 107 is fed to the device-side tape ejection port 11 via the tape delivery port 119, and the first ink ribbon 105 that has been paid out from the first paying-out core 111 is wound up by the first winding core 113.

Further, when the feeding motor rotates a reverse direction opposite to the normal direction, the first platen roller 109 rotates in the reverse direction opposite to the normal direction and the first paying-out core 111 rotates in a rewinding direction. Thus, the first printing tape 103 that has been ejected from the tape delivery port 119 is returned to the inside of the first cartridge case, and the first ink ribbon 105 that has been paid out from the first paying-out core 111 is rewound on the first paying-out core 111. As described above, the first paying-out shaft 41 inserted into the first paying-out core 111 and the first winding shaft 43 inserted into the first winding core 113 constitute a first ink ribbon transportation mechanism that feeds the first ink ribbon 105.

By rotating the feeding motor in the normal direction and heating the printing head 55, the tape printing device 1 prints printing information input via the keyboard or the like on the first printing tape 103 while feeding the first printing tape 103 and the first ink ribbon 105. After the completion of the printing, the tape printing device 1 causes the cutter 17 to perform a cutting operation to cut off a printed portion of the first printing tape 103. Then, by rotating the feeding motor in the reverse direction, the tape printing device 1 returns the first printing tape 103 until the tip end of the first printing tape 103 comes to the vicinity of a position at which the tip end is sandwiched between the printing head 55 and the first platen roller 109, i.e., the vicinity of a printing position. Thus, it is possible to reduce a margin to be created on the front side in the length direction of the first printing tape 103 that is to be next printed since the printing head 55 and the cutter 17 are separated from each other.

MODIFIED EXAMPLES

Besides the above embodiments, various configurations are adoptable without departing from the spirit as a matter of course. For example, the above embodiments are capable of being modified into the following modes.

The tape cartridge 101 may be configured not to include the first circuit substrate 165. Similarly, the ribbon cartridge 201 may be configured not to include the second circuit substrate 327. Further, the ribbon cartridge 201 may be configured not to include the tape retention part 305.

Cartridges are not limited to those having a configuration in which a printing tape or an ink ribbon is accommodated such as the tape cartridge 101 and the ribbon cartridge 201 of the present embodiment, but may only be required to have a configuration that allows the cartridges to be installed in the tape printing device 1.

The cartridge installation part 7 is not limited to a configuration in which the tape cartridge 101 and the ribbon cartridge 201 are alternatively installed, but may have a configuration in which only the ribbon cartridge 201 is installed.

Further, the above embodiments and the modified examples may be combined together.

SUPPLEMENTARY NOTES

Hereinafter, a cartridge will be supplementally noted. A cartridge to be installed in a tape printing device, the cartridge including: a platen roller; a paying-out core on which an ink ribbon is wound; and a winding core that winds up the ink ribbon paid out from the paying-out core, wherein, when seen from a rotational axis direction parallel to a rotational axis of the paying-out core and a rotational axis of the winding core, the paying-out core and the winding core are arranged to at least partially overlap an imaginary line that passes through a center of the platen roller and extends in a longitudinal direction of the cartridge.

According to the configuration, the center of gravity of the cartridge moves in a direction substantially parallel to the imaginary line as the winding of the ink ribbon progresses. That is, the platen roller that is a heavy stuff is provided on a substantial extension line in the movement direction of the center of gravity. Therefore, it is possible to reduce the movement amount of the center of gravity of the cartridge accompanied by the progress of the winding of the ink ribbon. Thus, the cartridge is prevented from being inclined with respect to the tape printing device. Accordingly, it is possible to prevent the ink ribbon from becoming wrinkled and prevent the occurrence of a printing failure such as printing wrinkles. Further, a user is allowed to easily hold the ribbon cartridge 201 by gripping the ribbon-side second peripheral wall part 217 and the ribbon-side fourth peripheral wall part 223 when attaching and detaching the ribbon cartridge 201. Since the center of gravity of the cartridge moves in the substantially parallel direction with respect to the ribbon-side second peripheral wall part 217 and the ribbon-side fourth peripheral wall part 223, the ribbon cartridge 201 is not liable to be inclined with respect to the installation direction when the user attaches and detaches the ribbon cartridge 201. Therefore, it is possible to smoothly attach and detach the ribbon cartridge 201.

In this case, the platen roller is preferably provided close to one end in the longitudinal direction of the cartridge when seen from the rotational axis direction, and the paying-out core and the winding core are preferably provided close to the other end in the longitudinal direction of the cartridge when seen from the rotational axis direction.

According to the configuration, it is possible to reduce the movement amount of the center of gravity of the cartridge accompanied by the progress of the winding of the ink ribbon in the longitudinal direction of the cartridge.

In this case, the paying-out core is preferably provided closer to the platen roller than the winding core.

According to the configuration, the dimension between the paying-out core and the platen roller is reduced. Therefore, it is possible to prevent the ink ribbon from becoming wrinkled between the paying-out core and the platen roller.

In this case, an inter-core dimension that is a dimension between a center of the paying-out core and a center of the winding core is preferably smaller than a total roll value that is a total value of a maximum paying-out-side roll radius that is a radius of a paying-out-side roll in a state in which the whole ink ribbon is wound on the paying-out core and a maximum winding-side roll radius that is a radius of a winding-side roll in a state in which the whole ink ribbon is wound up by the winding core.

According to the configuration, the paying-out core and the winding core are arranged adjacent to each other. Thus, it is possible to reduce the movement amount of the center of gravity of the cartridge accompanied by the progress of the winding of the ink ribbon. Further, it is possible to miniaturize the cartridge.

In this case, the cartridge preferably includes a cartridge case that accommodates the platen roller, the paying-out core, and the winding core, the cartridge case preferably has a peripheral wall part, and the peripheral wall part preferably has, when seen from the rotational axis direction, a curvature surface that is positioned between a first facing portion facing one end of the winding core in the longitudinal direction of the cartridge and a second facing portion facing one end of the winding core in a direction orthogonal to the longitudinal direction of the cartridge, and that is formed into a convex shape protruding toward an outside of the cartridge case.

According to the configuration, it is possible to reduce the gap between the winding-side roll and the peripheral wall part. Therefore, it is possible to miniaturize the cartridge.

In this case, the cartridge case preferably has a first case and a second case that are combined together in the rotational axis direction, the peripheral wall part preferably includes a first peripheral wall part that is provided in the first case and a second peripheral wall part that is provided in the second case, one of the first peripheral wall part and the second peripheral wall part preferably has an insertion hole, the other of the first peripheral wall part and the second peripheral wall part preferably has an insertion pin that is inserted into the insertion hole, and the insertion hole and the insertion pin are preferably provided so as to avoid the curvature surface.

According to the configuration, it is possible to further reduce the gap between the winding side roll and the peripheral wall part compared with a configuration in which the insertion pin and the insertion hole are provided at the curvature surface.

In this case, the tape printing device preferably includes a cartridge installation part in which the cartridge is installed, a printing head that is provided in the cartridge installation part, sandwiches the ink ribbon and a printing tape between the printing head and the platen roller, and performs printing on the printing tape, and a device case, the device case preferably has a device-side tape introduction port that introduces the printing tape from an outside to an inside of the device case and a device-side tape ejection port that ejects the printing tape to the outside of the device case, and the cartridge preferably includes a tape path through which the printing tape introduced from the device-side tape introduction port is fed toward the device-side tape ejection port in a state in which the cartridge is installed in the cartridge installation part.

According to the configuration, it is possible to prevent the occurrence of a printing failure such as printing wrinkles in the printing tape introduced into the tape path from the device-side tape introduction port.

EXPLANATION OF REFERENCE SYMBOLS

1: tape printing device
3: device case
7: cartridge installation part
9: device-side tape introduction port
11: device-side tape ejection port
55: printing head
201: ribbon cartridge
203: second platen roller
205: second ink ribbon
206: second paying-out core
207: second winding core
211: second cartridge case
221: first curvature surface
228: first facing portion
230: second facing portion
233: ribbon-part front-side case
237: second back-side case
241: ribbon-part front-side peripheral wall part
242: ribbon-part insertion pin
249: ribbon-part back-side peripheral wall part
250: ribbon-part insertion hole
257: second tape path
D: inter-core dimension
L: imaginary line
r1: maximum paying-out-side roll radius
r2: maximum winding-side roll radius

The invention claimed is:

1. A cartridge to be installed in a tape printing device, the cartridge comprising:
a platen roller;
a paying-out core on which an ink ribbon is wound; and
a winding core that winds up the ink ribbon paid out from the paying-out core, wherein,
when seen from a rotational axis direction parallel to a rotational axis of the paying-out core and a rotational axis of the winding core, the paying-out core and the winding core are arranged to at least partially overlap an imaginary line that passes through a center of the platen roller and extends in a longitudinal direction of the cartridge.

2. The cartridge according to claim 1, wherein
the platen roller is provided close to one end in the longitudinal direction of the cartridge when seen from the rotational axis direction, and
the paying-out core and the winding core are provided close to the other end in the longitudinal direction of the cartridge when seen from the rotational axis direction.

3. The cartridge according to claim 1, wherein the paying-out core is provided closer to the platen roller than the winding core.

4. The cartridge according to claim 1, wherein
an inter-core dimension that is a dimension between a center of the paying-out core and a center of the winding core is smaller than a total roll value that is a total value of a maximum paying-out-side roll radius that is a radius of a paying-out-side roll in a state in which the whole ink ribbon is wound on the paying-out core and a maximum winding-side roll radius that is a radius of a winding-side roll in a state in which the whole ink ribbon is wound up by the winding core.

5. The cartridge according to claim 1, further comprising:
a cartridge case that accommodates the platen roller, the paying-out core, and the winding core, wherein
the cartridge case has a peripheral wall part, and
the peripheral wall part has, when seen from the rotational axis direction, a curvature surface that is positioned between a first facing portion facing one end of the winding core in the longitudinal direction of the cartridge and a second facing portion facing one end of the winding core in a direction orthogonal to the longitudinal direction of the cartridge, and that is formed into a convex shape protruding toward an outside of the cartridge case.

6. The cartridge according to claim 5, wherein
the cartridge case has a first case and a second case that are combined together in the rotational axis direction,
the peripheral wall part includes a first peripheral wall part that is provided in the first case and a second peripheral wall part that is provided in the second case,
one of the first peripheral wall part and the second peripheral wall part has an insertion hole,
the other of the first peripheral wall part and the second peripheral wall part has an insertion pin that is inserted into the insertion hole, and
the insertion hole and the insertion pin are provided so as to avoid the curvature surface.

7. The cartridge according to claim 1, wherein
the tape printing device includes
a cartridge installation part in which the cartridge is installed,
a printing head that is provided in the cartridge installation part, sandwiches the ink ribbon and a printing tape between the printing head and the platen roller, and performs printing on the printing tape, and
a device case,
the device case has a device-side tape introduction port that introduces the printing tape from an outside to an inside of the device case and a device-side tape ejection port that ejects the printing tape to the outside of the device case, and
the cartridge includes a tape path through which the printing tape introduced from the device-side tape introduction port is fed toward the device-side tape ejection port in a state in which the cartridge is installed in the cartridge installation part.

8. The cartridge according to claim 1, wherein a first distance between the paying-out core and the platen roller is shorter than a second distance between the winding core and the platen roller.

* * * * *